US009787390B2

(12) United States Patent
Guo et al.

(10) Patent No.: US 9,787,390 B2
(45) Date of Patent: Oct. 10, 2017

(54) DATA TRANSMISSION METHOD AND DEVICE

(71) Applicant: Huawei Technologies Co., Ltd., Shenzhen (CN)

(72) Inventors: Bolun Guo, Shenzhen (CN); Xinrui Feng, Shenzhen (CN); Yong Wu, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/235,297

(22) Filed: Aug. 12, 2016

(65) Prior Publication Data

US 2016/0352410 A1    Dec. 1, 2016

Related U.S. Application Data

(63) Continuation of application No. PCT/CN2014/072056, filed on Feb. 13, 2014.

(51) Int. Cl.
*H04B 7/15*     (2006.01)
*H04B 7/155*    (2006.01)
(Continued)

(52) U.S. Cl.
CPC ........ *H04B 7/15507* (2013.01); *H04W 16/26* (2013.01); *H04W 84/047* (2013.01); *H04W 88/04* (2013.01)

(58) Field of Classification Search
CPC .. H04B 7/15507; H04W 88/04; H04W 16/26; H04W 84/047
(Continued)

(56) References Cited

U.S. PATENT DOCUMENTS 7,792,492 B2 *  9/2010  Wong .................... H04W 72/14
                                                        370/347
8,799,637 B2 *  8/2014  Hane .................... H04L 63/0428
                                                        713/150
(Continued)

FOREIGN PATENT DOCUMENTS

CN    101137182 A    3/2008
CN    101448321 A    6/2009
(Continued)

*Primary Examiner* — Dominic Rego
(74) *Attorney, Agent, or Firm* — Leydig, Voit & Mayer, Ltd.

(57) ABSTRACT

A data transmission method and a device are disclosed. The method includes: receiving, by a third-party node in a specified first spectrum, a request message sent by a network side device that belongs to an operator different from an operator of the third-party node, where the request message is used to request the third-party node to forward data that is transmitted between the network side device and a terminal served by the network side device; returning, by the third-party node, a response message to the network side device in the first spectrum after the third-party node determines to accept the request of the network side device; and forwarding, by the third-party node in a second spectrum, the data that is transmitted between the network side device and the terminal, where the second spectrum is a spectrum of the operator to which the network side device belongs.

18 Claims, 6 Drawing Sheets

(51) Int. Cl.
*H04W 16/26* (2009.01)
*H04W 88/04* (2009.01)
*H04W 84/04* (2009.01)

(58) Field of Classification Search
USPC ...... 455/11.1, 13.1, 16, 12.1, 13.2; 370/226,
370/243, 246, 274, 279, 293, 315, 316,
370/492
See application file for complete search history.

(56) References Cited

U.S. PATENT DOCUMENTS

| | | | | |
|---|---|---|---|---|
| 9,026,173 | B2* | 5/2015 | Chandra | ............... H04W 88/06 370/310 |
| 9,247,447 | B1* | 1/2016 | Vivanco | ............ H04W 28/0226 |
| 2002/0159513 | A1* | 10/2002 | Williams | ............ H04L 12/5602 375/222 |
| 2006/0223561 | A1* | 10/2006 | Capece | ................ H04B 7/2606 455/509 |
| 2008/0013459 | A1 | 1/2008 | Do et al. | |
| 2010/0265408 | A1* | 10/2010 | Katsube | .................... H04L 1/18 348/723 |
| 2010/0329216 | A1* | 12/2010 | Jen | ....................... H04B 7/2606 370/332 |
| 2011/0103269 | A1* | 5/2011 | Zheng | ................ H04B 7/15557 370/279 |
| 2011/0130088 | A1* | 6/2011 | Ikeda | ................. H04B 7/15542 455/7 |
| 2013/0028169 | A1* | 1/2013 | Bontu | ................ H04B 7/15542 370/315 |
| 2013/0287009 | A1* | 10/2013 | Ahn | ................. H04W 72/1289 370/336 |
| 2013/0331093 | A1 | 12/2013 | Cho et al. | |

FOREIGN PATENT DOCUMENTS

| | | |
|---|---|---|
| CN | 102958168 A | 3/2013 |
| EP | 2296420 A1 | 3/2011 |
| EP | 2688348 A1 | 1/2014 |
| WO | WO 2012028200 A1 | 3/2012 |

\* cited by examiner

DATA TRANSMISSION METHOD AND DEVICE

CROSS-REFERENCE TO RELATED APPLICATION

This application is a continuation of International Application No. PCT/CN2014/072056, filed on Feb. 13, 2014, which is incorporated herein by reference in its entirety.

TECHNICAL FIELD

Embodiments of the present invention relate to the field of wireless communications technologies, and in particular, to data transmission methods and devices.

BACKGROUND

As a quantity of mobile users increasingly grows, traffic volumes of mobile communications also increase unceasingly. To satisfy ever-increasing mobile users and traffic volumes, deployment density of base stations in a network needs to be gradually increased, causing a problem that operators need to deploy more base stations. A macro base station (Macro Station) in a traditional network architecture has a large coverage area, but a signal area of the macro base station has many blind spots. A small cell (Small Station) has small transmit power, flexible and fast deployment, low costs, high spectrum utilization, and other features, and can be used as a supplement to a macro base station, to improve a user rate of a macro base station-edge coverage area, thereby improving a throughput of an entire system.

Currently, the operators are generally responsible for establishing and maintaining respective base stations of the operators during station deployment, to increase system capacity of the operators. This is applicable to a scenario of a traditional macro base station network architecture, but many problems exist in a small cell scenario. First, station establishment miniaturization inevitably requires that the operators deploy more small cells. If more small cells are deployed in residential districts or other private areas, great inconvenience would be caused to users' living in the foregoing areas. Second, network construction costs and operation and maintenance costs increase accordingly as a quantity of base stations increases. The costs herein not only include network deployment costs at an early stage, but also include operation and maintenance costs, energy consumption costs, and the like at middle and later stages.

In a base station miniaturization and intensification scenario, utilization of a base station, a terminal, and another wireless network device are not always saturated, and a tidal effect exists. For example, the base station or the another wireless network device serves a limited quantity of terminals, and services needed by the terminals served by the base station or the another wireless network device also fluctuate greatly, where large traffic volumes are required in some periods of time while small traffic volumes are required in some other periods of time. Therefore, idle resources may occur in these wireless network devices. However, in a current wireless communications network, idle resources in wireless network devices are not utilized, and consequently, these idle resources are wasted.

SUMMARY

Embodiments of the present invention provide data transmission methods and devices, so as to resolve a problem that in a current wireless communications network, idle resources in a wireless network device are not utilized, and consequently, these idle resources are wasted.

According to a first aspect, a data transmission method is provided, where the method includes:

receiving, by a third-party node in a specified first spectrum, a request message sent by a network side device that belongs to an operator different from an operator of the third-party node, where the request message is used to request the third-party node to forward data that is transmitted between the network side device and a terminal served by the network side device;

returning, by the third-party node, a response message to the network side device in the first spectrum after the third-party node determines to accept the request of the network side device; and forwarding, by the third-party node in a second spectrum, the data that is transmitted between the network side device and the terminal, where the second spectrum is a spectrum of the operator to which the network side device belongs.

With reference to the first aspect, in a first possible implementation manner, before the receiving, by a third-party node, a request message sent by a network side device, the method further includes:

after the third-party node receives, in the first spectrum, a broadcast message sent by the network side device, sending, by the third-party node to the network side device in the first spectrum, a feedback message used to indicate that the third-party node is in an idle state; or when the third-party node determines that the third-party node is in an idle state, sending, by the third-party node in the first spectrum, a pilot signal used to indicate that the third-party node is in an idle state.

With reference to the first possible implementation manner of the first aspect, in a second possible implementation manner, after the receiving, by a third-party node, a request message sent by a network side device, the method further includes: stopping sending, by the third-party node, the pilot signal in the first spectrum.

With reference to the first aspect or the first possible implementation manner of the first aspect, in a third possible implementation manner, the method further includes:

when the third-party node determines that a status of the third-party node changes, notifying, by the third-party node, the network side device that the status of the third-party node changes, where the status of the third-party node includes an idle state and a non-idle state.

With reference to the first aspect or any one of the first to the third possible implementation manners of the first aspect, in a fourth possible implementation manner, the method further includes:

after the third-party node receives, in the first spectrum, a notification message sent by the network side device, stopping forwarding, by the third-party node, the data that is transmitted between the network side device and the terminal.

With reference to the fourth possible implementation manner of the first aspect, in a fifth possible implementation manner, the third-party node stops forwarding the data that is transmitted between the network side device and the terminal, and the method further includes:

when the third-party node determines that the third-party node is in an idle state, sending, by the third-party node in the first spectrum, the pilot signal used to indicate that the third-party node is in an idle state.

With reference to the first aspect or any one of the first to the fifth possible implementation manners of the first aspect, in a sixth possible implementation manner, the first spectrum is an unlicensed spectrum; or the first spectrum is a part of a spectrum of at least one operator of multiple operators, and network side devices and/or terminals of the multiple operators all can use the first spectrum.

According to a second aspect, a data transmission method is provided, where the method includes:

selecting, by a network side device, at least one third-party node from a first node list that includes a third-party node that belongs to an operator different from an operator of the network side device;

sending, by the network side device, a request message to the selected at least one third-party node in a specified first spectrum, where the request message is used to request the selected third-party node to forward data that is transmitted between the network side device and the terminal; and after the network side device receives, in the first spectrum, a response message returned by the selected third-party node, sending, by the network side device, data to the terminal in a second spectrum by using the selected third-party node, and/or receiving, by the network side device in a second spectrum by using the selected third-party node, data sent by the terminal, where the second spectrum is a spectrum of the operator to which the network side device belongs.

With reference to the second aspect, in a first possible implementation manner, the network side device creates the first node list in any one of the following manners:

sending, by the network side device, a broadcast message in the first spectrum, and after receiving a feedback message sent by a third-party node in an idle state, storing the third-party node in the first node list; or receiving, by the network side device, a pilot signal that is sent by a third-party node in an idle state in the first spectrum and that is used to indicate that the third-party node is in an idle state, and storing the third-party node in the first node list; or receiving, by the network side device, a pilot signal that is sent by a third-party node in an idle state in the first spectrum and that is used to indicate that the third-party node is in an idle state, storing the third-party node in the first node list, receiving, by the network side device, a second node list that is sent by the terminal served by the network side device, that is stored in the terminal, and that includes at least one third-party node that can be used by the terminal, and storing the second node list.

With reference to the second aspect or the first possible implementation manner of the second aspect, in a second possible implementation manner, the method further includes:

updating, by the network side device in a set update period, the first node list stored in the network side device; or when the network side device determines that data that is transmitted between the network side device and the terminal served by the network side device needs to be forwarded by using a third-party node, updating, by the network side device, the first node list stored in the network side device; or after receiving a message that is sent by any third-party node and that is used to notify each network side device that a status of the third-party node changes, updating, by the network side device, the first node list stored in the network side device; or updating, by the network side device according to signal quality, of each third-party node in the second node list, that is obtained by means of detection by the terminal and that is notified by the terminal, the second node list stored in the network side device.

With reference to the second aspect, the first possible implementation manner of the second aspect, or the second possible implementation manner of the second aspect, in a third possible implementation manner, the selecting, by the network side device, at least one third-party node from the first node list specifically includes:

randomly selecting, by the network side device, at least one third-party node from the first node list; or acquiring, by the network side device, information about a location of the terminal, and selecting, from the first node list, at least one third-party node that is the closest to the location of the terminal; or selecting, by the network side device, at least one third-party node from third-party nodes included in both the first node list and the second node list.

With reference to the second aspect or any one of the first to the third possible implementation manners of the second aspect, in a fourth possible implementation manner, after the network side device forwards, by using the selected third-party node, the data that is transmitted between the network side device and the terminal, the method further includes:

determining, by the network side device according to channel quality information fed back by the terminal, whether to continue forwarding, by using the selected third-party node, the data that is transmitted between the network side device and the terminal.

With reference to the fourth possible implementation manner of the second aspect, in a fifth possible implementation manner, if the network side device determines to finish forwarding, by using the selected third-party node, the data that is transmitted between the network side device and the terminal, the method further includes: sending, by the network side device, a notification message to the selected third-party node in the first spectrum, to instruct the selected third-party node to stop forwarding the data that is transmitted between the network side device and the terminal.

With reference to the fifth possible implementation manner of the second aspect, in a sixth possible implementation manner, after the sending, by the network side device, a notification message to the selected third-party node, the method further includes: reselecting, by the network side device, a third-party node from the first node list, sending data to the terminal by using the reselected third-party node, and receiving, by using the reselected third-party node, data sent by the terminal.

With reference to the second aspect or any one of the first to the sixth possible implementation manners of the second aspect, in a seventh possible implementation manner, the first spectrum is an unlicensed spectrum; or the first spectrum is a part of a spectrum of at least one operator of multiple operators, and network side devices and/or terminals of the multiple operators all can identify the first spectrum.

According to a third aspect, a data transmission method is provided, where the method includes:

receiving, by a terminal that is in communication connection with a network side device, in a second spectrum, data that is sent by the network side device and that is forwarded by a third-party node that is selected by the network side device and that belongs to an operator different from an operator of the network side device, where the second spectrum is a spectrum of the operator to which the network side device belongs; and sending, by the terminal, data to the network side device in the second spectrum, where the data sent by the terminal is forwarded to the network side device by using the third-party node.

With reference to the third aspect, in a first possible implementation manner, the method further includes:

sending, by the terminal, indication information to the network side device, to instruct the network side device to forward, by using the third-party node, the data that is transmitted between the network side device and the terminal.

With reference to the third aspect or the first possible implementation manner of the third aspect, in a second possible implementation manner, the method further includes:

receiving, by the terminal, a pilot signal that is sent by a third-party node in an idle state in a specified first spectrum and that is used to indicate that the third-party node is in an idle state, and storing the third-party node in a second node list; and sending, by the terminal, the second node list to the network side device.

With reference to the second possible implementation manner of the third aspect, in a third possible implementation manner, the method further includes:

detecting, by the terminal in a set detection period, signal quality of each third-party node in the second node list, and notifying the acquired signal quality to the network side device.

With reference to the second possible implementation manner of the third aspect, in a fourth possible implementation manner, the method further includes:

detecting, by the terminal in a set detection period, signal quality of each third-party node in the second node list, and updating, according to the acquired signal quality, the second node list stored in the terminal; or updating, by the terminal in a set update period, the second node list stored in the terminal.

With reference to any one of the second to the fourth possible implementation manners of the third aspect, in a fifth possible implementation manner, the first spectrum is an unlicensed spectrum; or the first spectrum is a part of a spectrum of at least one operator of multiple operators, and network side devices and/or terminals of the multiple operators all can use the first spectrum.

According to a fourth aspect, a third-party node is provided, where the third-party node includes:

a transceiver module, configured to receive, in a specified first spectrum, a request message sent by a network side device that belongs to an operator different from an operator of the third-party node, where the request message is used to request the selected third-party node to forward data that is transmitted between the network side device and a terminal served by the network side device;

a processing module, configured to: after it is determined to accept the request of the network side device, return a response message to the network side device in the first spectrum; and a forwarding module, configured to forward, in a second spectrum, the data that is transmitted between the network side device and the terminal, where the second spectrum is a spectrum of the operator to which the network side device belongs.

With reference to the fourth aspect, in a first possible implementation manner, before receiving the request message sent by the network side device, the transceiver module is further configured to: after receiving, in the first spectrum, a broadcast message sent by the network side device, send, to the network side device in the first spectrum, a feedback message used to indicate that the third-party node is in an idle state; or when it is determined that the third-party node is in an idle state, send, in the first spectrum, a pilot signal used to indicate that the third-party node is in an idle state.

With reference to the first possible implementation manner of the fourth aspect, in a second possible implementation manner, after receiving the request message sent by the network side device, the transceiver module is further configured to stop sending the pilot signal in the first spectrum.

With reference to the fourth aspect or the first possible implementation manner of the fourth aspect, in a third possible implementation manner, the transceiver module is further configured to: when it is determined that a status of the third-party node changes, notify the network side device that the status of the third-party node changes, where the status of the third-party node includes an idle state and a non-idle state.

With reference to the fourth aspect or any one of the first to the third possible implementation manners of the fourth aspect, in a fourth possible implementation manner, if the transceiver module receives, in the first spectrum, a notification message sent by the network side device, the forwarding module is further configured to stop forwarding the data that is transmitted between the network side device and the terminal.

With reference to the fourth possible implementation manner of the fourth aspect, in a fifth possible implementation manner, the forwarding module stops forwarding the data that is transmitted between the network side device and the terminal, and the transceiver module is further configured to: when it is determined that the third-party node is in an idle state, send, in the first spectrum, the pilot signal used to indicate that the third-party node is in an idle state.

According to a fifth aspect, a network side device is provided, where the network side device includes:

a processing module, configured to select at least one third-party node from a first node list that includes a third-party node that belongs to an operator different from an operator of the network side device;

a sending module, configured to send, in a first spectrum, a request message to each selected third-party node, where the request message is used to request the selected third-party node to forward data that is transmitted between the network side device and the terminal; and a transmission module, configured to: after a response message returned by the selected third-party node is received in the first spectrum, send data to the terminal in a second spectrum by using the selected third-party node, and/or receive, in a second spectrum by using the selected third-party node, data sent by the terminal, where the second spectrum is a spectrum of the operator to which the network side device belongs.

With reference to the fifth aspect, in a first possible implementation manner, the processing module creates the first node list in any one of the following manners:

sending a broadcast message in the first spectrum, and after a feedback message sent by a third-party node in an idle state is received, storing the third-party node in the first node list; or receiving a pilot signal that is sent by a third-party node in an idle state in the first spectrum and that is used to indicate that the third-party node is in an idle state, and storing the third-party node in the first node list; or receiving a pilot signal that is sent by a third-party node in an idle state in the first spectrum and that is used to indicate that the third-party node is in an idle state, storing the third-party node in the first node list, receiving a second node list that is sent by the terminal served by the network side device, that is stored in the terminal, and that includes at least one third-party node that can be used by the terminal, and storing the second node list.

With reference to the fifth aspect or the first possible implementation manner of the fifth aspect, in a second possible implementation manner of the fifth aspect, the processing module is further configured to:

update, in a set update period, the first node list stored in the network side device; or when it is determined that data that is transmitted between the network side device and the terminal served by the network side device needs to be forwarded by using a third-party node, update the first node list stored in the network side device; or after a message that is sent by any third-party node and that is used to notify each network side device that a status of the third-party node changes is received, update the first node list stored in the network side device; or update, according to signal quality, of each third-party node in the second node list, that is obtained by means of detection by the terminal and that is notified by the terminal, the second node list stored in the network side device.

With reference to the fifth aspect, the first possible implementation manner of the fifth aspect, or the second possible implementation manner of the fifth aspect, in a third possible implementation manner, the selecting, by the processing module, at least one third-party node from the first node list specifically includes:

randomly selecting at least one third-party node from the first node list; or acquiring information about a location of the terminal, and selecting, from the first node list, at least one third-party node that is the closest to the location of the terminal; or selecting at least one third-party node from third-party nodes included in both the first node list and the second node list.

With reference to the fifth aspect or any one of the first to the third possible implementation manners of the fifth aspect, in a fourth possible implementation manner, the processing module is further configured to determine, according to channel quality information fed back by the terminal, whether to continue forwarding, by using the selected third-party node, the data that is transmitted between the network side device and the terminal.

With reference to the fourth possible implementation manner of the fifth aspect, in a fifth possible implementation manner, if the processing module determines to finish forwarding, by using the selected third-party node, the data that is transmitted between the network side device and the terminal, the sending module is further configured to send a notification message to the selected third-party node in the first spectrum, to instruct the selected third-party node to stop forwarding the data that is transmitted between the network side device and the terminal.

With reference to the fifth possible implementation manner of the fifth aspect, in a sixth possible implementation manner, after the sending module sends the notification message to the selected third-party node, the processing module is further configured to: reselect a third-party node from the first node list, send data to the terminal by using the reselected third-party node, and receive, by using the reselected third-party node, data sent by the terminal.

According to a sixth aspect, a terminal is provided, where the terminal is in communication connection with a network side device, and the terminal includes:

a receiving module, configured to receive, in a second spectrum, data that is sent by the network side device and that is forwarded by a third-party node that is selected by the network side device and that belongs to an operator different from an operator of the network side device, where the second spectrum is a spectrum of the operator to which the network side device belongs; and a sending module, configured to send data to the network side device in the second spectrum, where the data is forwarded to the network side device by using the third-party node.

With reference to the sixth aspect, in a first possible implementation manner, the sending module is further configured to send indication information to the network side device, to instruct the network side device to forward, by using the third-party node, the data that is transmitted between the network side device and the terminal.

With reference to the sixth aspect, or the first possible implementation manner of the sixth aspect, in a second possible implementation manner, the receiving module is further configured to: receive a pilot signal that is sent by a third-party node in an idle state in a specified first spectrum and that is used to indicate that the third-party node is in an idle state, and store the third-party node in a second node list; and the sending module is further configured to send the second node list to the network side device.

With reference to the second possible implementation manner of the sixth aspect, in a third possible implementation manner, the terminal further includes a processing module, where the processing module is configured to detect, in a set detection period, signal quality of each third-party node in the second node list, and the sending module is further configured to notify the signal quality acquired by the processing module to the network side device.

With reference to the second possible implementation manner of the sixth aspect, in a fourth possible implementation manner, the terminal further includes a processing module, where the processing module is configured to: detect, in a set detection period, signal quality of each third-party node in the second node list, and update, according to the acquired signal quality, the second node list stored in the terminal; or update, in a set update period, the second node list stored in the terminal.

According to a seventh aspect, another third-party node is provided, where the third-party node includes a transceiver and at least one processor connected to the transceiver, where:

the transceiver is configured to receive, in a specified first spectrum, a request message sent by a network side device that belongs to an operator different from an operator of the third-party node, where the request message is used to request the selected third-party node to forward data that is transmitted between the network side device and a terminal served by the network side device; and the processor is configured to: after it is determined to accept the request of the network side device, trigger the transceiver to return a response message to the network side device in the first spectrum; and trigger the transceiver to forward, in a second spectrum, the data that is transmitted between the network side device and the terminal, where the second spectrum is a spectrum of the operator to which the network side device belongs.

With reference to the seventh aspect, in a first possible implementation manner, before receiving the request message sent by the network side device, the transceiver is further configured to:

after receiving, in the first spectrum, a broadcast message sent by the network side device, send, to the network side device in the first spectrum, a feedback message used to indicate that the third-party node is in an idle state; or when it is determined that the third-party node is in an idle state, send, in the first spectrum, a pilot signal used to indicate that the third-party node is in an idle state, and details are not described herein again.

With reference to the first possible implementation manner of the seventh aspect, in a second possible implementation manner, after receiving the request message sent by the network side device, the transceiver is further configured to stop sending the pilot signal in the first spectrum.

With reference to the seventh aspect or the first possible implementation manner of the seventh aspect, in a third possible implementation manner, the processor is further configured to: when it is determined that a status of the third-party node changes, trigger the transceiver to notify the network side device that the status of the third-party node changes, where the status of the third-party node includes an idle state and a non-idle state.

With reference to the seventh aspect or any one of the first to the third possible implementation manners of the seventh aspect, in a fourth possible implementation manner, if the transceiver receives, in the first spectrum, a notification message sent by the network side device, the transceiver stops forwarding the data that is transmitted between the network side device and the terminal.

With reference to the fourth possible implementation manner of the seventh aspect, in a fifth possible implementation manner, after the transceiver stops forwarding the data that is transmitted between the network side device and the terminal, the processor is further configured to: when it is determined that the third-party node is in an idle state, trigger the transceiver to send, in the first spectrum, the pilot signal used to indicate that the third-party node is in an idle state.

According to an eighth aspect, another network side device is provided, where the network side device includes a transceiver, at least one processor connected to the transceiver, and a memory separately connected to the transceiver and the processor, where:

the processor is configured to select at least one third-party node from a first node list that includes a third-party node that belongs to an operator different from an operator of the network side device; and the transceiver is configured to send, in a specified first spectrum, a request message to each selected third-party node, where the request message is used to request the selected third-party node to forward data that is transmitted between the network side device and the terminal; and after receiving, in the first spectrum, a response message returned by the selected third-party node, send data to the terminal in a second spectrum by using the selected third-party node, and/or receive, in a second spectrum by using the selected third-party node, data sent by the terminal, where the second spectrum is a spectrum of the operator to which the network side device belongs.

With reference to the eighth aspect, in a first possible implementation manner, the network side device creates the first node list in any one of the following manners:

sending, by the transceiver, a broadcast message in the first spectrum, and after a feedback message sent by a third-party node in an idle state is received, storing, by the processor, the third-party node in the first node list in the memory; or receiving, by the transceiver, a pilot signal that is sent by a third-party node in an idle state in the first spectrum and that is used to indicate that the third-party node is in an idle state, and storing, by the processor, the third-party node in the first node list in the memory; or receiving, by the transceiver, a pilot signal that is sent by a third-party node in an idle state in the first spectrum and that is used to indicate that the third-party node is in an idle state, storing, by the processor, the third-party node in the first node list, receiving, by the transceiver, a second node list that is sent by a terminal served by the network side device, that is stored in the terminal, and that includes at least one third-party node that can be used by the terminal, and storing, by the processor, the second node list in the memory.

With reference to the eighth aspect or the first possible implementation manner of the eighth aspect, in a second possible implementation manner, the processor is further configured to: update, in a set update period, the first node list stored in the memory; or when it is determined that data that is transmitted between the network side device and the terminal served by the network side device needs to be forwarded by using a third-party node, update the first node list stored in the memory; or after the transceiver receives a message that is sent by any third-party node and that is used to notify each network side device that a status of the third-party node changes, update the first node list stored in the memory; or update, according to signal quality, of each third-party node in the second node list, that is obtained by means of detection by the terminal and that is notified by the terminal, the second node list stored in the memory.

With reference to the eighth aspect, the first possible implementation manner of the eighth aspect, or the second possible implementation manner of the eighth aspect, in a third possible implementation manner, the selecting, by the processor, at least one third-party node from a first node list specifically includes:

randomly selecting at least one third-party node from the first node list stored in the memory; or acquiring information about a location of the terminal, and selecting, from the first node list stored in the memory, at least one third-party node that is the closest to the location of the terminal; or selecting at least one third-party node from third-party nodes included in both the first node list and the second node list that are stored in the memory.

With reference to the eighth aspect or any one of the first to the third possible implementation manners of the eighth aspect, in a fourth possible implementation manner, the processor is further configured to determine, according to channel quality information fed back by the terminal, whether to continue forwarding, by using the selected third-party node, the data that is transmitted between the network side device and the terminal.

With reference to the fourth possible implementation manner of the eighth aspect, in a fifth possible implementation manner, if the processor determines to finish forwarding, by using the selected third-party node, the data that is transmitted between the network side device and the terminal, the transceiver is further configured to send a notification message to the selected third-party node in the first spectrum, to instruct the selected third-party node to stop forwarding the data that is transmitted between the network side device and the terminal.

With reference to the fifth possible implementation manner of the eighth aspect, in a sixth possible implementation manner, after the transceiver sends the notification message to the selected third-party node, the processor is further configured to: reselect a third-party node from the first node list stored in the memory, and instruct the transceiver to send data to the terminal by using the reselected third-party node and to receive, by using the reselected third-party node, data sent by the terminal.

According to a ninth aspect, another terminal is provided, where the terminal is in communication connection with a network side device, and the terminal includes a transceiver, at least one processor connected to the transceiver, and a memory separately connected to the transceiver and the processor, where:

the transceiver is configured to receive, in a second spectrum, data that is sent by the network side device and that is forwarded by a third-party node that is selected by the network side device and that belongs to an operator different from an operator of the network side device, where the second spectrum is a spectrum of the operator to which the network side device belongs; and send data to the network side device in the second spectrum, where the data is forwarded to the network side device by using the third-party node.

With reference to the ninth aspect, in a first possible implementation manner, the transceiver is further configured to send indication information to the network side device, to instruct the network side device to forward, by using the third-party node, the data that is transmitted between the network side device and the terminal.

With reference to the ninth aspect, or the first possible implementation manner of the ninth aspect, in a second possible implementation manner, the transceiver is further configured to receive a pilot signal that is sent by a third-party node in an idle state in a specified first spectrum and that is used to indicate that the third-party node is in an idle state; the processor is further configured to store the third-party node in a second node list stored in the memory; and the transceiver is further configured to send the second node list to the network side device.

With reference to the second possible implementation manner of the ninth aspect, in a third possible implementation manner, the processor is further configured to detect, in a set detection period, signal quality of each third-party node in the second node list, and the transceiver is further configured to notify, to the network side device, the signal quality acquired by the processor.

With reference to the second possible implementation manner of the ninth aspect, in a fourth possible implementation manner, the processor is further configured to: detect, in a set detection period, signal quality of each third-party node in the second node list, and update, according to acquired signal quality, the second node list stored in the memory; or update, in a set update period, the second node list stored in the memory.

According to the data transmission method and the device provided in the embodiments of the present invention, idle resources of a third-party node that belongs to an operator different from an operator of a network side device can be fully utilized, to provide a data forwarding service for the network side device and a terminal served by the network side device. Therefore, signal amplification and data forwarding services of the network side device are completed, and signal transmission quality is improved. Because a third-party node can be utilized to provide a data forwarding service, a quantity of network side devices that need to be deployed can be reduced.

DESCRIPTION OF EMBODIMENTS

In embodiments of the present invention, a network side device selects at least one third-party node that belongs to an operator different from an operator of the network side device, and forwards data between the network side device and a terminal served by the network side device, so that resources of the third-party node can be fully utilized to provide a data forwarding service for the network side device and the terminal served by the network side device, and a quantity of network side devices that need to be deployed can be reduced.

In the embodiments of the present invention, the third-party node refers to an open sharing node that can provide a data forwarding service for a device (a network side device and a terminal) of another operator except an operator to which the third-party node belongs, and is also referred to as an O-Node (Open Node). The third-party node may be a neutral node or device (for example, a repeater) that does not belong to any existing operator, or may be a node (such as a base station, a relay, or a terminal) that is currently in an idle state and that can provide a data forwarding service for a device (a network side device and a terminal) of another operator except the operator to which the third-party node belongs.

The following further describes the embodiments of the present invention in detail with reference to the accompanying drawings of this specification. It should be understood that the embodiments described herein are merely used to describe and explain the present invention, rather than limiting the present invention.

Figure 1:
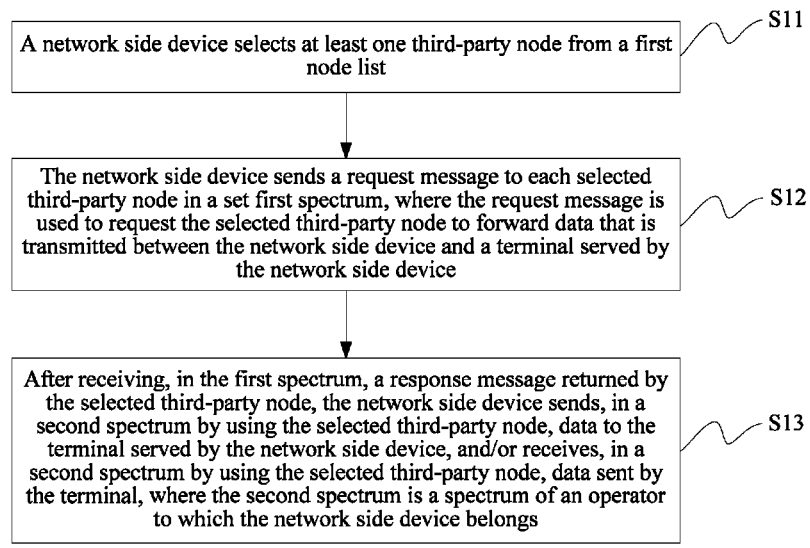
FIG. 1 is a schematic diagram of a data transmission method on a side of a network side device according an embodiment of the present invention.

Referring to FIG. 1, an embodiment of the present invention provides a data transmission method on a side of a network side device. The method includes:

S11. The network side device selects at least one third-party node from a first node list that includes a third-party node that belongs to an operator different from an operator of the network side device.

In this step, when the network side device determines that a specified triggering condition is met, the network side device selects at least one third-party node from the first node list stored in the network side device. The network side device may select only one third-party node from the first node list stored in the network side device, to forward data that is transmitted between the network side device and a terminal served by the network side device; or may select two or more than two third-party nodes from the first node list stored in the network side device, to forward data that is transmitted between the network side device and a terminal served by the network side device. Because multiple third-party nodes jointly serve the terminal, signal transmission quality is improved.

In this step, the first node list stored in the network side device includes at least one third-party node that can provide a data forwarding service for the network side device and the terminal served by the network side device.

S12. The network side device sends a request message to each selected third-party node in a specified first spectrum, where the request message is used to request the selected third-party node to forward data that is transmitted between the network side device and a terminal served by the network side device.

In this embodiment of the present invention, the first spectrum refers to a spectrum that can be identified by network side devices and/or terminals of multiple operators, where the first spectrum may be an unlicensed (unlicensed) spectrum, or may be a part of a spectrum of at least one operator of the multiple operators.

Specifically, when the first spectrum is a part of a spectrum of at least one operator of the multiple operators, the multiple operators perform negotiation to determine the first spectrum, and network side devices and/or terminals of the multiple operators identify the first spectrum. The first spectrum may be a part of a spectrum of an operator of the multiple operators, or the first spectrum may include a part of a spectrum of two or more than two operators of the multiple operators.

S13. After receiving, in the first spectrum, a response message returned by the selected third-party node, the network side device sends, in a second spectrum by using the selected third-party node, data to the terminal served by the network side device, and/or receives, in a second spectrum by using the selected third-party node, data sent by the terminal, where the second spectrum is a spectrum of the operator to which the network side device belongs.

Specifically, after receiving, in the first spectrum, the response message returned by the selected third-party node, the network side device may send, in the second spectrum, data to the terminal served by the network side device. In this case, because the third-party node has been listening on the second spectrum, the third-party node may acquire, from the second spectrum, the data sent by the network side device to the terminal, and directly forward (transparently transmit) the data to the terminal served by the network side device; or may receive, in the spectrum, data that is sent by the terminal served by the network side device and that is forwarded by the selected third-party node.

In this embodiment of the present invention, the spectrum of the operator to which the network side device belongs refers to a dedicated spectrum configured by a system for the operator to which the network side device belongs, that is, an exclusive spectrum of the operator to which the network side device belongs. A device of the operator (including a network side device and a terminal) may transmit data in the dedicated spectrum configured by the system for the operator.

In this embodiment of the present invention, a network side device selects at least one third-party node from a first node list that is stored in the network side device and that includes a third-party node that belongs to an operator different from an operator of the network side device; sends a request message to each third-party node in a first spectrum; and after receiving, in the first spectrum, a response message returned by the selected third-party node, sends, in a second spectrum by using the selected third-party node, data to a terminal served by the network side device, and receives, by using the selected third-party node, data sent by the terminal, so that idle resources of the third-party node can be fully utilized to provide a data forwarding service for the network side device and the terminal served by the network side device. Therefore, signal amplification and data forwarding services of the network side device are completed, and signal transmission quality is improved. Because a third-party node can be utilized to provide a data forwarding service, a quantity of network side devices that need to be deployed can be reduced.

The network side device in this embodiment of the present invention may be a base station (for example, a macro base station, or a home eNodeB), or may be an RN (relay) device, or may be another network side device.

In an implementation, in step S11, the network side device determines, specifically in the following two manners, that the specified triggering condition is met:

Manner 1. When the network side device determines, according to channel quality information reported by the terminal, that quality of a channel between the network side device and the terminal is less than a set value, the network side device determines that the specified triggering condition is met.

In this manner, the network side device determines, according to the channel quality information reported by the terminal, that the specified triggering condition is met, where the channel quality information reported by the terminal may be a channel state information (Channel State Information, CSI) feedback, a channel quality indicator (Channel Quality Indicator, CQI), or the like.

Manner 2. After receiving indication information sent by the terminal, the network side device determines that the specified triggering condition is met, where the indication information is used to instruct the network side device to forward, by using the third-party node, the data that is transmitted between the network side device and the terminal.

In this embodiment of the present invention, the network side device may determine, in either of the foregoing manners, that the specified triggering condition is met.

In this embodiment of the present invention, the network side device creates the first node list in any one of the following manners:

Manner 1. The network side device sends a broadcast message in the first spectrum, and after receiving a feedback message sent by a third-party node in an idle state, stores the third-party node in the first node list, to create the first node list.

Specifically, when the network side device determines that the data that is transmitted between the network side device and the terminal served by the network side device needs to be forwarded by using a third-party node, or in a set broadcast period, the network side device sends a broadcast message in the first spectrum.

In this manner, when the network side device determines that the data that is transmitted between the network side device and the terminal served by the network side device needs to be forwarded by using a third-party node, the network side device proactively sends a broadcast message in the first spectrum, to acquire a third-party node that is in an idle state, and to create a first node list that includes at least one third-party node that can be used by the network side device.

Correspondingly, after a third-party node that can receive a broadcast message sent by the network side device receives the broadcast message, if the third-party node is in an idle state, the third-party node returns a feedback message to the network side device, to notify the network side device that the third-party node is in an idle state; if the third-party node is in an idle state, the third-party node ignores the broadcast message, that is, does not return a feedback message to the network side device.

Manner 2. The network side device receives a pilot signal that is sent by a third-party node in an idle state in the first spectrum and that is used to indicate that the third-party node is in an idle state, and stores the third-party node in the first node list, to create the first node list.

In this manner, if the third-party node is in an idle state, the third-party node sends the pilot signal in the first spectrum, to notify a device (a network side device and/or a terminal) of each operator that the third-party node is currently in an idle state.

Correspondingly, the network side device can receive, in the first spectrum, a pilot signal that is sent by each third-party node that is in an idle state, and stores these third-party nodes in the first node list, to create the first node list that includes at least one third-party node that can be used by the network side device.

Manner 3. The network side device receives a pilot signal that is sent by a third-party node in an idle state in the first spectrum and that is used to indicate that the third-party node is in an idle state, and stores the third-party node in a first node list; and the network side device receives a second node list that is sent by the terminal served by the network side device, that is stored in the terminal, and that includes at least one third-party node that can be used by the terminal, and stores the second node list.

In this manner, if the third-party node is in an idle state, the third-party node sends the pilot signal in the first spectrum, to notify a device (a network side device and/or a terminal) of each operator that the third-party node is currently in an idle state. Correspondingly, the network side device can receive, in the first spectrum, receive a pilot signal sent by each third-party node in an idle state, and store these third-party nodes in the first node list, to create the first node list that includes at least one third-party node that can be used by the network side device. If the terminal can also receive, in the first spectrum, a pilot signal sent by each third-party node in an idle state, the terminal stores these third-party nodes in the second node list, to create the second node list that includes at least one third-party node that can be used by the terminal, and notifies the second node list stored in the terminal to the network side device to which the terminal belongs. Further, after receiving the second node list sent by the terminal served by the network side device, the network side device stores a second node list sent by each terminal.

In this embodiment of the present invention, the first node list stored in the network side device includes identifier information of each third-party node that belongs to an operator different from the operator of the network side device, that can provide a data forwarding service for the network side device and the terminal served by the network side device, and that is determined by the network side device.

Further, the first node list further includes information used to indicate quality of a signal between the foregoing third-party node and the network side device. Specifically, the network side device may acquire quality of a signal between each third-party node and the network side device in the following manner:

acquiring, by the network side device according to a feedback of the third-party node, quality of a signal between the third-party node and the network side device; or measuring, by the network side device, a pilot signal sent by the third-party node, to acquire quality of a signal between the third-party node and the network side device.

In this embodiment of the present invention, the second node list stored in the terminal includes identifier information of each third-party node that belongs to an operator different from the operator of the network side device, that can provide a data forwarding service for the terminal and the network side device to which the terminal belongs, and that is determined by the terminal.

Further, the second node list further includes information used to indicate quality of a signal between the foregoing third-party node and the terminal. Specifically, the network side device may acquire quality of a signal between each third-party node and the network side device in the following manner:

receiving the quality, which is fed back by the terminal, of the signal between each third-party node and the terminal, where the terminal measures a pilot signal sent by the third-party node, to acquire the quality of the signal between the third-party node and the terminal, and feeds back the measured quality of the signal between each third-party node and the terminal to the network side device.

Based on the foregoing three manners of creating a first node list, in an implementation, the network side device further updates the first node list (and/or the second node list) stored in the network side device. Specifically, the following four manners are included:

1. For the foregoing manner 1, the network side device updates, in a set update period, the first node list stored in the network side device.

Specifically, in each set update period, the network side device sends a broadcast message in the first spectrum at least once, to acquire a third-party node that is currently in an idle state, and updates the first node list stored in the network side device.

2. For the foregoing manner 1, when the network side device determines that the data that is transmitted between the network side device and the terminal served by the network side device needs to be forwarded by using a third-party node, the network side device updates the node list stored in the network side device.

Specifically, each time the network side device determines that the data that is transmitted between the network side device and the terminal served by the network side device needs to be forwarded by using a third-party node, the network side device sends a broadcast message in the first spectrum at least once, to acquire a third-party node that is currently in an idle state, and updates the first node list stored in the network side device.

3. For the foregoing manner 2 and manner 3, after receiving a message that is sent by any third-party node and that is used to notify each network side device that a status of the third-party node changes, the network side device updates the node list stored in the network side device.

Specifically, after the third-party node determines that the status of the third-party node changes, for example, changes from an idle state to a non-idle state or from a non-idle state to an idle state, the third-party node notifies a current status of the third-party node to each network side device. Correspondingly, after receiving a message that is sent by any third-party node and that is used to notify each network side device that a status of the third-party node changes, the network side device updates the first node list stored in the network side device, which is specifically:

if the third-party node changes from an idle state to a non-idle state: if the first node list of the network side device includes the third-party node, deleting, by the network side device, the third-party node from the first node list; if the first node list of the network side device does not include the third-party node, performing, by the network side device, no processing; or if the third-party node changes from a non-idle state to an idle state: if the first node list of the network side device does not include the third-party node, adding, by the network side device, the third-party node to the first node list; if the first node list of the network side device includes the third-party node, performing, by the network side device, no processing.

4. For the foregoing manner 3, the network side device updates, according to signal quality, of each third-party node in the second node list, that is obtained by means of detection by the terminal and that is notified by the terminal, the second node list stored in the network side device.

Specifically, the terminal has a function of detecting the signal quality of each third-party node in the second node list stored in the terminal, and feeds back a detection result to the network side device to which the terminal belongs. Correspondingly, after receiving the signal quality, of each third-party node in the second node list, that is obtained by means of detection by the terminal and that is notified by the terminal, the network side device updates the second node list stored in the network side device, which is specifically:

if signal quality of at least one third-party node is less than a set lower limit value, deleting, by the network side device, information related to the third-party node from the second node list stored in the network side device; or if signal quality of at least one third-party node is not less than a set lower limit value, performing, by the network side device, no processing on the third-party node.

In an implementation, in step S11, the selecting, by a network side device, at least one third-party node from a first node list that includes a third-party node that belongs to an operator different from an operator of the network side device specifically includes the following three methods:

Manner 1. The network side device randomly selects at least one third-party node from the first node list stored in the network side device.

Specifically, the network side device finds, from the first node list stored in the network side device, at least one optimum third-party node by means of random selection and traversal.

Manner 2. The network side device acquires information about a location of the terminal, and selects, from the first node list, at least one third-party node that is the closest to the location of the terminal.

In this manner, the network side device needs to be capable of acquiring information of a current location of the terminal and information about a location of each third-party node in the first node list, so that the network side device may select, from the first node list, at least one third-party node that is the closest to the location of the terminal.

Specifically, if only one third-party node is to be selected, a third-party node that is the closest to the location of the terminal is selected from the first node list. If at least two third-party nodes are to be selected, at least two third-party nodes are selected from the first node list in ascending order of distances between third-party nodes and the location of the terminal.

Manner 3. The network side device selects at least one third-party node from third-party nodes included in both the first node list and the second node list that is reported by the terminal.

Specifically, when the network side device determines that the specified triggering condition is met, the network side device selects at least one third-party node from the third-party nodes included in both the first node list stored in the network side device and the second node list reported by the terminal.

In this embodiment of the present invention, after step S13, the method further includes:

determining, by the network side device according to channel quality information fed back by the terminal, whether to continue forwarding, by using the selected third-party node, the data that is transmitted between the network side device and the terminal.

Specifically, the terminal periodically reports channel quality information. In this case, because data that is transmitted between the network side device and the terminal is forwarded by using the third-party node, the terminal reports channel quality information of a link (that is, an access (Access) link) between the third-party node and the terminal. Correspondingly, the network side device may determine, according to the channel quality information fed back by the terminal, whether to continue forwarding, by using the selected third-party node, the data that is transmitted between the network side device and the terminal, which is specifically:

if the network side device determines, according to the channel quality information reported by the terminal, that channel quality of a link between the terminal and the third-party node is less than a set value, the network side device determines to finish forwarding, by using the selected third-party node, the data that is transmitted between the network side device and the terminal; or if the network side device determines, according to the channel quality information reported by the terminal, that channel quality of a link between the terminal and the third-party node is not less than a set value, the network side device determines to continue forwarding, by using the selected third-party node, the data that is transmitted between the network side device and the terminal.

Further, if the network side device determines to finish forwarding, by using the selected third-party node, the data that is transmitted between the network side device and the terminal, the method provided in this embodiment of the present invention further includes:

sending, by the network side device, a notification message to the selected third-party node in the first spectrum, to instruct the selected third-party node to stop forwarding the data that is transmitted between the network side device and the terminal.

Further, after the sending, by the network side device, a notification message to the selected third-party node, the method further includes:

reselecting, by the network side device, a third-party node from the first node list stored in the network side device, sending data to the terminal by using the reselected third-party node, and/or receiving, by using the reselected third-party node, data sent by the terminal.

Specifically, the network side device may reselect, by means of any method of the foregoing method 1 to method 3, a third-party node from the first node list stored in the network side device.

Figure 2:
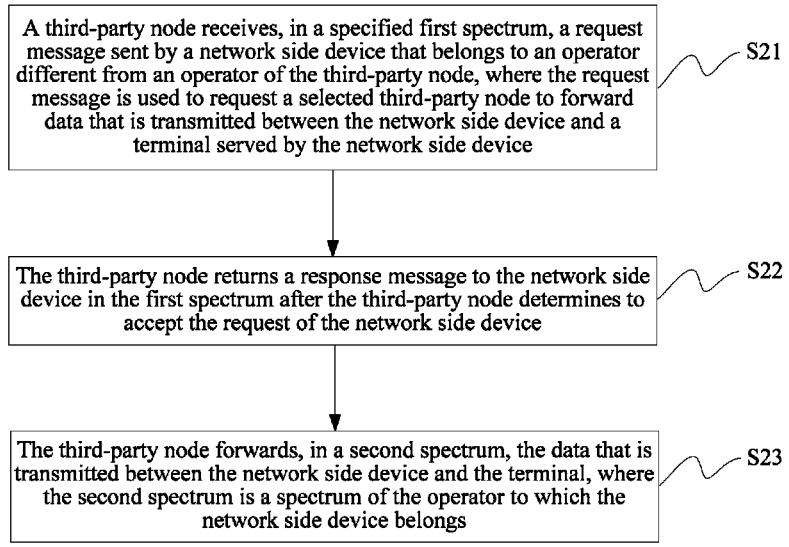
FIG. 2 is a schematic diagram of a data transmission method on a side of a third-party node according an embodiment of the present invention.

Based on a same inventive concept, an embodiment of the present invention further provides a data transmission method on a side of a third-party node. Referring to FIG. 2, the method includes:

S21. The third-party node receives, in a specified first spectrum, a request message sent by a network side device that belongs to an operator different from an operator of the third-party node, where the request message is used to request the selected third-party node to forward data that is transmitted between the network side device and a terminal served by the network side device.

In this step, the first spectrum refers to a spectrum that can be identified by network side devices and/or terminals of multiple operators, where the first spectrum may be an unlicensed (unlicensed) spectrum, or may be a part of a spectrum of at least one operator of the multiple operators.

S22. The third-party node returns a response message to the network side device in the first spectrum after the third-party node determines to accept the request of the network side device.

Specifically, after receiving, in the first spectrum, the request message sent by the network side device, if the third-party node is in an idle state, the third-party node returns the response message to the network side device, to notify the network side device that the third-party node can forward the data that is transmitted between the network side device and the terminal served by the network side device. If the third-party node is in an idle state, the third-party node ignores the request message, that is, does not return the response message to the network side device.

S23. The third-party node forwards, in a second spectrum, the data that is transmitted between the network side device and the terminal, where the second spectrum is a spectrum of the operator to which the network side device belongs.

Specifically, after returning the response message to the network side device, the third-party node has been listening on the second spectrum. If there is data that is sent by the network side device to the terminal in the second spectrum, the third-party node directly forwards (that is, transparently transmits) the data to the terminal. If there is data that is sent by the terminal to the network side device in the spectrum, the third-party node directly forwards (that is, transparently transmits) the data to the network side device, to complete a service of forwarding the data that is transmitted between the network side device and the terminal.

In this embodiment of the present invention, the spectrum of the operator to which the network side device belongs refers to a dedicated spectrum configured by a system for the operator to which the network side device belongs, that is, an exclusive spectrum of the operator to which the network side device belongs. A device of the operator (including a network side device and a terminal) may transmit data in the dedicated spectrum configured by the system for the operator.

In this embodiment of the present invention, a third-party node receives, in a first spectrum, a request message sent by a network side device, and returns a response message to the network side device in the first spectrum after the third-party node determines to accept the request of the network side device; and forwards, in a second spectrum, data that is transmitted between the network side device and the terminal. Therefore, signal amplification and data forwarding services of the network side device are completed, and signal transmission quality is improved.

In an implementation, before step S21, the method further includes:

after the third-party node receives, in the first spectrum, a broadcast message sent by the network side device, sending, by the third-party node in the first spectrum to the network side device, a feedback message used to indicate that the third-party node is in an idle state, and for details, refer to the foregoing manner 1, which is not described herein again;

or when the third-party node determines that the third-party node is in an idle state, sending, by the third-party node in the first spectrum, a pilot signal used to indicate that the third-party node is in an idle state, and for details, refer to the foregoing manner 2 and the foregoing manner 3, which are not described herein again.

In an implementation, in step S21, after the receiving, by a third-party node, a request message sent by a network side device, the method further includes:

stopping sending, by the third-party node in the first spectrum, the pilot signal used to indicate that the third-party node is in an idle state.

In an implementation, the method provided in this embodiment of the present invention further includes:

when the third-party node determines that a status of the third-party node changes, notifying, by the third-party node, the network side device served by the third-party node that the status of the third-party node changes, where the status of the third-party node includes an idle state and a non-idle state.

Specifically, after the third-party node determines that the status of the third-party node changes, for example, changes from an idle state to a non-idle state or from a non-idle state to an idle state, the third-party node notifies a current status of the third-party node to each network side device.

In an implementation, the method provided in this embodiment of the present invention further includes:

after the third-party node receives, in the first spectrum, a notification message sent by the network side device, stopping forwarding, by the third-party node, the data that is transmitted between the network side device and the terminal served by the network side device.

Further, after the stopping forwarding, by the third-party node, the data that is transmitted between the network side device and the terminal served by the network side device, the method further includes:

when the third-party node determines that the third-party node is in an idle state, sending, by the third-party node in the first spectrum, the pilot signal used to indicate that the third-party node is in an idle state.

Figure 3:
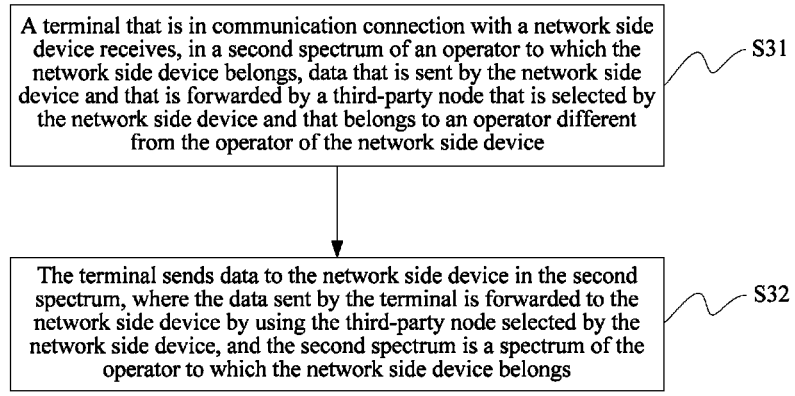
FIG. 3 is a schematic diagram of a data transmission method on a side of a terminal according an embodiment of the present invention.

Based on a same inventive concept, an embodiment of the present invention further provides a data transmission method on a side of a terminal. Referring to FIG. 3, the method includes:

S31. The terminal that is in communication connection with a network side device receives, in a second spectrum, data that is sent by the network side device and that is forwarded by a third-party node that is selected by the network side device and that belongs to an operator different from an operator of the network side device.

In this step, the third-party node directly forwards (transparently transmits), to the terminal in the second spectrum, data that is sent by the network side device to the terminal.

In this embodiment of the present invention, the spectrum of the operator to which the network side device belongs refers to a dedicated spectrum configured by a system for the operator to which the network side device belongs, that is, an exclusive spectrum of the operator to which the network side device belongs. A device of the operator (including a network side device and a terminal) may transmit data in the dedicated spectrum configured by the system for the operator.

S32. The terminal sends data to the network side device in the second spectrum, where the data sent by the terminal is forwarded to the network side device by using the third-party node selected by the network side device.

In this embodiment of the present invention, a terminal that is in communication connection with a network side device receives, in a second spectrum, data that is sent by the network side device and that is forwarded by a third-party node selected by the network side device, and the terminal sends data to the network side device in the spectrum, where the data sent by the terminal is forwarded to the network side device by using the third-party node selected by the network side device. Therefore, the terminal in communication connection with the network side device can receive, in the second spectrum, the data that is forwarded by the third-party node selected by the network side device and that is sent to the terminal from the network side device, and the terminal can send data to the network side device by using the third-party node, so that idle resources of the third-party node are fully utilized to provide a data forwarding service for the network side device and a terminal served by the network side device. Therefore, signal amplification and data forwarding services of the network side device are completed, and signal transmission quality is improved. Because a third-party node can be utilized to provide a data forwarding service, a quantity of network side devices that need to be deployed can be reduced.

In an implementation, before step S31, the method provided in this embodiment of the present invention further includes:

sending, by the terminal, indication information to the network side device, to instruct the network side device to forward, by using the third-party node, the data that is transmitted between the network side device and the terminal.

Specifically, when the terminal determines that quality of a channel between the terminal and the network side device is less than a set value, the terminal sends indication information to the network side device.

In an implementation, the method provided in this embodiment of the present invention further includes:

reporting, by the terminal in a set reporting period, channel quality information to the network side device to which the terminal belongs.

Specifically, if the terminal and the network side device directly communicate with each other, the terminal reports channel quality information of a link between the terminal and the network side device. If data is forwarded between the terminal and the network side device by using the third-party node, the terminal reports channel quality information of a link between the terminal and the third-party node.

In an implementation, the method provided in this embodiment of the present invention further includes:

receiving, by the terminal, a pilot signal that is sent by a third-party node in an idle state in a specified first spectrum and that is used to indicate that the third-party node is in an idle state, and storing the third-party node in a second node list; and sending, by the terminal, the second node list to the network side device to which the terminal belongs.

Further, the method provided in this embodiment of the present invention further includes:

detecting, by the terminal in a set detection period, signal quality of each third-party node in the second node list stored in the terminal, and notifying the acquired signal quality to the network side device to which the terminal belongs.

In an implementation, the terminal further updates the second node list stored in the terminal. Specifically, the following two manners are included:

Manner A. The terminal detects, in the set detection period, signal quality of each third-party node in the second node list stored in the terminal, and updates, according to the acquired signal quality, the second node list stored in the terminal.

Specifically, the terminal detects, in the set detection period, the signal quality of each third-party node in the second node list stored in the terminal. If signal quality of at least one third-party node is less than a set lower limit value, the terminal deletes information related to the third-party node from the second node list stored in the terminal. If signal quality of at least one third-party node is not less than a set lower limit value, the terminal performs no processing on the third-party node.

Manner B. The terminal updates, in a set update period, the second node list stored in the terminal.

Specifically, in the set update period, if the terminal receives a pilot signal that is sent by at least one third-party node and that is used to indicate that the third-party node is in an idle state, the terminal adds the third-party node to the second node list.

To understand specific implementations of the present invention more completely, the following describes the data transmission method provided in the embodiments of the present invention with reference to three specific embodiments and from a perspective of cooperation among a network side device, a third-party node, and a terminal.

Embodiment 1

Figure 4:
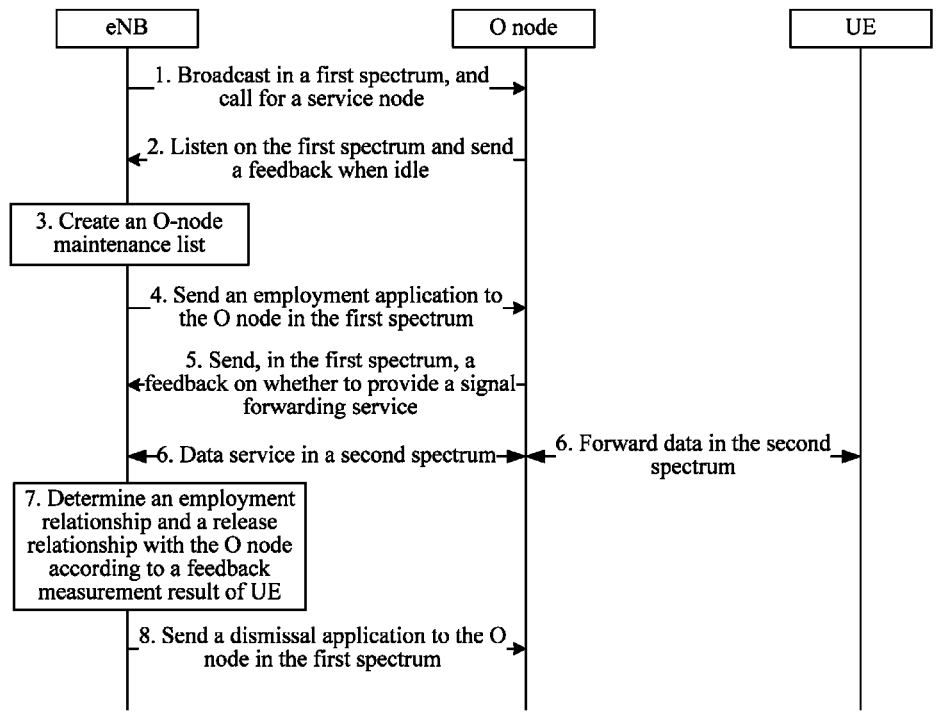
FIG. 4 is a schematic diagram of Embodiment 1 according to an embodiment of the present invention.

Referring to FIG. 4, this embodiment includes the following steps:

Step 1: A cell (CELL) sends a broadcast message in a specified first spectrum, to acquire an O node (that is, a third-party node) in an idle state.

Step 2: The O node located in a range close to the cell listens on the first spectrum when the O node is idle, and after obtaining the broadcast message by means of listening, the O node feeds back, to the cell, a response message used to indicate that the O node is in an idle state.

Step 3: After receiving a feedback of the idle state of the O node, the cell adds the O node to an O-node list maintained by the cell.

Further, the cell regularly updates the O-node list according to a service requirement. There may be two update manners: 1. The cell proactively updates the O-node list, that is, the cell periodically or aperiodically triggers an update of the O-node list according to a requirement of the cell, where the requirement of the cell includes: the cell determines, according to a signal quality status fed back by user equipment (User Equipment, UE), whether there is a requirement for using an O node; or after signal quality of UE degrades, the UE directly feeds back the degradation to the cell, to request the cell to start a procedure of finding an O node. 2. The cell passively updates the O-node list, that is, when a status of an O node changes, the O node proactively notifies the change to the cell, and the cell updates, according to a status fed back by the O node, the O-node list maintained by the cell.

Step 4: The cell selects an appropriate O node from the O-node list maintained by the cell, and sends an employment application to the O node.

Specifically, when performance of a CSI feedback, which is received on the cell side, of UE served by the cell degrades, or when the cell receives an application, which is sent by UE, of a procedure of starting an O node, the cell finds an appropriate O node from the O-node maintenance list maintained by the cell, and sends an employment application to the O node by using the first spectrum.

Further, a method used by the cell to find an appropriate employment object from the O-node maintenance list maintained by the cell includes: 1. The cell finds an optimum O node from the O-node service list of the cell by means of random selection and traversal. 2. The cell determines, according to locations of the O node and UE that is served by the cell, an O node that is the most possibly appropriate.

Step 5: After the O node receives the employment application, if the O node is currently in an idle state, the O node sends, to the cell, a feedback that the O node accepts the employment by the cell.

Step 6: The O node listens on a second spectrum, and provides a signal forwarding service in the second spectrum, where the second spectrum is a spectrum of an operator to which the cell belongs, and the O node is transparent to UE.

Step 7: The cell adjusts, according to a CSI feedback of the UE, an employment relationship to the O node (that is, the cell continues using the O node, the cell dismisses the O node, or the cell searches for another employed node).

Step 8: If the cell determines to finish using a resource of the O node, the cell sends a dismissal notification to the O node in the first spectrum, to instruct the O node to stop forwarding data that is transmitted between the cell and the UE.

In this embodiment, the cell communicates with the O node in the first spectrum, to establish an employment relationship and a release relationship, and incorporates the O node that belongs to a third party into a communications system of the cell, to complete signal amplification and forwarding services of the cell. This embodiment can fully utilize a feature of a micro base station network, and fully utilize an idle node in a network, to improve signal transmission quality.

Embodiment 2

Figure 5:
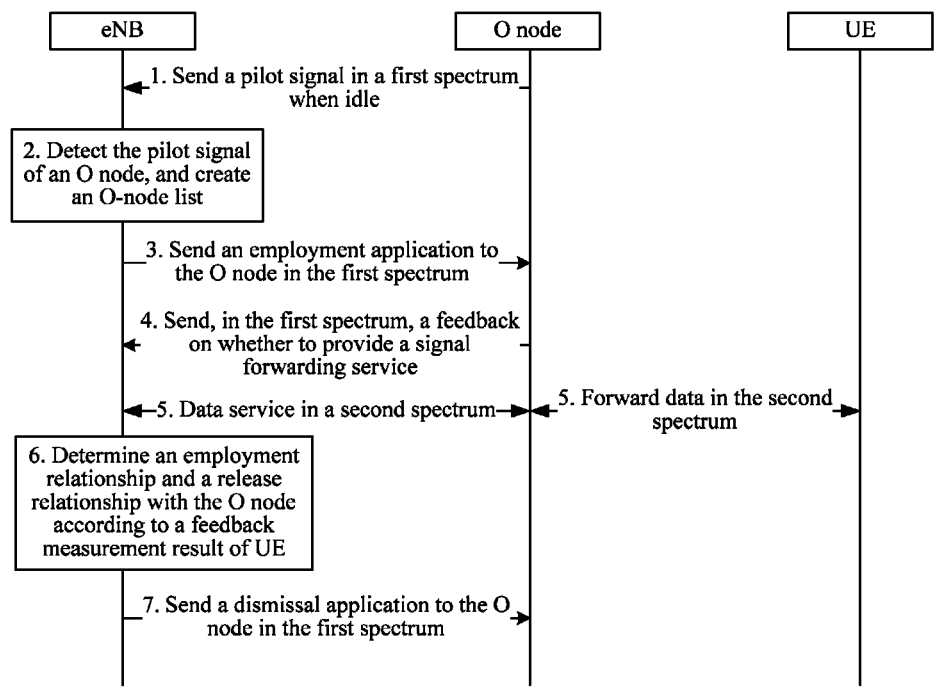
FIG. 5 is a schematic diagram of Embodiment 2 according to an embodiment of the present invention.

Referring to FIG. 5, this embodiment includes the following steps:

Step 1: An O node sends a pilot signal in a specified first spectrum.

Specifically, when the O node determines that the O node is currently in an idle state, the O node sends the pilot signal in the first spectrum, where the first spectrum may be identified by cells of different operators.

Step 2: A cell receives, in the first spectrum, the pilot signal of the O node, determines that the O node is currently in an idle state, and creates an O-node list.

Specifically, after receiving, in the first spectrum, the pilot signal of the O node, the cell determines that the O node is currently in an idle state, and adds the O node to the O-node list, to create the O-node list.

Step 3: The cell selects an appropriate O node from the O-node list maintained by the cell, and sends an employment application to the O node.

Specifically, when performance of a CSI feedback, which is received on the cell side, of UE served by the cell degrades, or when the cell receives an application, which is sent by UE, of a procedure of starting an O node, the cell finds an appropriate O node from the O-node maintenance list maintained by the cell, and sends an employment application to the O node by using the first spectrum.

Further, a method used by the cell to find an appropriate employment object from the O-node maintenance list maintained by the cell includes: 1. The cell finds an optimum O node from the O-node service list of the cell by means of random selection and traversal. 2. The cell determines, according to locations of the O node and UE that is served by the cell, an O node that is the most possibly appropriate.

Step 4: After the O node receives the employment application, if the O node is currently in an idle state, the O node sends, to the cell, a feedback that the O node accepts the employment by the cell.

In this step, if the O node accepts the employment application of the cell, the O node implements data forwarding in a second spectrum, and stops sending the pilot signal in the first spectrum, where the second spectrum is a spectrum of an operator to which the cell belongs.

Step 5: The O node listens on a second spectrum, and provides a signal forwarding service in the second spectrum, where the O node is transparent to UE.

Step 6: The cell adjusts, according to a CSI feedback of the UE, an employment relationship to the O node (that is, the cell continues using the O node, the cell dismisses the O node, or the cell searches for another employed node).

Step 7: If the cell determines to finish using a resource of the O node, the cell sends a dismissal notification to the O node in the first spectrum, to instruct the O node to stop forwarding data that is transmitted between the cell and the UE.

In this step, after receiving the dismissal notification sent by the cell, the O node stops forwarding the data that is transmitted between the cell and the UE, and resends a pilot signal in the first spectrum.

In this embodiment, the O node sends the pilot signal in the first spectrum, so that the cell side can accurately identify the pilot signal to learn that the O node is in an idle state. Further, the cell may establish a communication connection to the O node that is in an idle state, so as to incorporate the O node into an entire communication procedure. This embodiment can fully utilize a feature of a micro base station network, and fully utilize an idle node in a network, to improve signal transmission quality.

Embodiment 3

Figure 6:
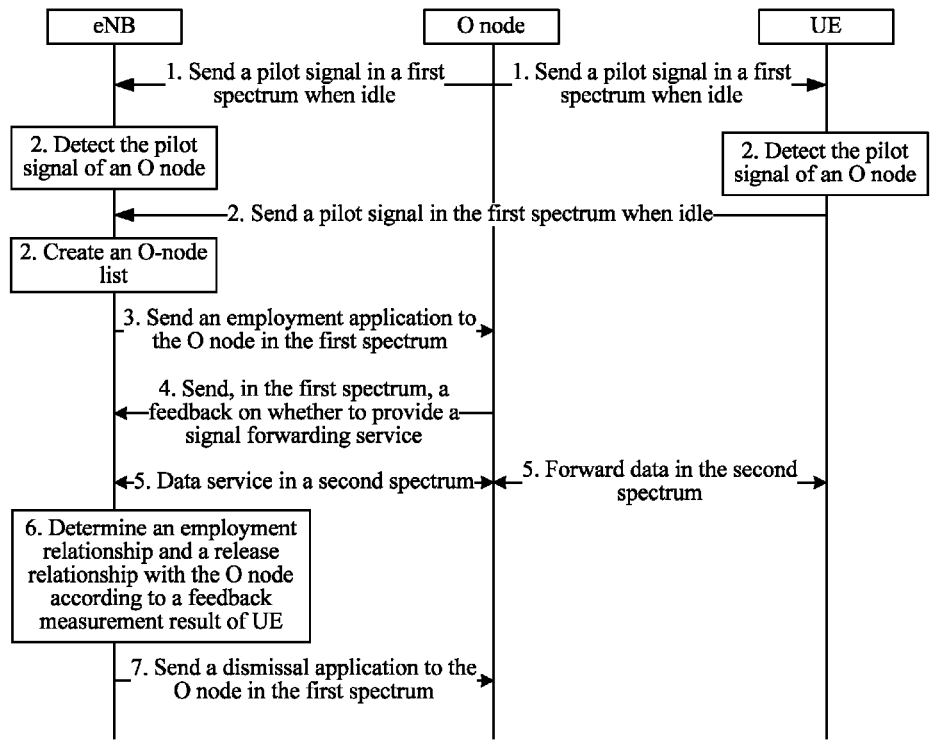
FIG. 6 is a schematic diagram of Embodiment 3 according to an embodiment of the present invention.

Referring to FIG. 6, this embodiment includes the following steps:

Step 1: An O node sends a pilot signal in a specified first spectrum.

Specifically, when the O node determines that the O node is currently in an idle state, the O node sends the pilot signal in the first spectrum, where the first spectrum may be identified by cells and UEs of different operators.

Step 2: UE or a cell detects the pilot signal of the O node in the first spectrum.

For the cell, after receiving the pilot signal of the O node in the first spectrum, the cell determines that the O node is currently in an idle state, and adds the O node to an O-node list, to create the O-node list. For the UE, after the UE receives the pilot signal of the O node, if quality of the pilot signal is relatively good (for example, the quality of the pilot signal is greater than a set lower limit value), the UE adds the O node to an O-node service list of the UE, and feeds back the O node list of the UE to the cell.

Step 3: The cell selects an appropriate O node from an O-node list maintained by the cell, and sends an employment application to the O node.

Specifically, when performance of a CSI feedback, which is received on the cell side, of the UE served by the cell degrades, or when the cell receives an application, which is sent by the UE, of a procedure of starting an O node, the cell finds an appropriate O node from the O-node maintenance list maintained by the cell, and sends an employment application to the O node by using the first spectrum.

Further, a method used by the cell to find an appropriate employment object from the O-node maintenance list maintained by the cell includes: 1. The cell finds an optimum O node from the O-node service list of the cell by means of random selection and traversal. 2. The cell determines, according to locations of the O node and UE that is served by the cell, an O node that is the most possibly appropriate. 3. The cell selects at least one O node from O nodes that are included in both the O-node list of the cell and the O-node list that is fed back by the UE.

Step 4: After the O node receives the employment application, if the O node is currently in an idle state, the O node sends, to the cell, a feedback that the O node accepts the employment by the cell.

In this step, if the O node accepts the employment application of the cell, the O node implements data forwarding in a second spectrum, and stops sending the pilot signal in the first spectrum, where the second spectrum is a spectrum of an operator to which the cell belongs.

Step 5: The O node listens on a second spectrum, and provides a signal forwarding service in the second spectrum, where the O node is transparent to the UE.

Step 6: The cell adjusts, according to a CSI feedback of the UE, an employment relationship to the O node (that is, the cell continues using the O node, the cell dismisses the O node, or the cell searches for another employed node).

Step 7: If the cell determines to finish using a resource of the O node, the cell sends a dismissal notification to the O node in the first spectrum, to instruct the O node to stop forwarding data that is transmitted between the cell and the UE.

In this step, after receiving the dismissal notification sent by the cell, the O node stops forwarding the data that is transmitted between the cell and the UE, and resends a pilot signal in the first spectrum.

In this embodiment, the O node sends the pilot signal in the first spectrum, so that the cell side or the UE side can accurately identify the pilot signal to learn that the O node is in an idle state. The UE feeds back the O-node list of the UE to the cell side. Further, the cell may establish a communication connection to the O node, so as to incorporate the O node into an entire communication procedure. In this embodiment, because an O node measurement function of the UE is introduced, an effect that the cell and the UE jointly detect an appropriate O node can be achieved, so that accuracy of selecting, by the cell, an appropriate O node is higher. This embodiment can fully utilize a feature of a micro base station network, and fully utilize an idle node in a network, to improve signal transmission quality.

It should be noted that the concept of a cell (cell) in the foregoing embodiments is equivalent to that of a base station.

The foregoing method processing procedure may be implemented by using a software program, where the software program may be stored in a storage medium. When the stored software program is invoked, the foregoing method steps are performed.

Figure 7:
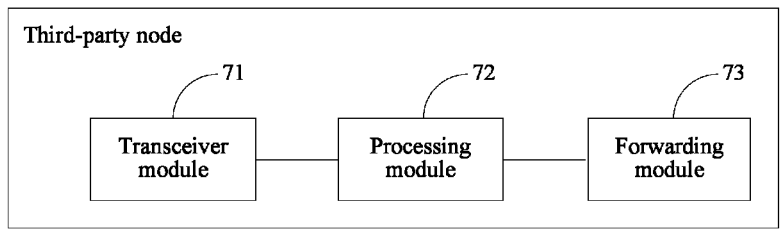
FIG. 7 is a schematic structural diagram of a third-party node according an embodiment of the present invention.

Based on a same inventive concept, an embodiment of the present invention further provides a third-party node. Referring to FIG. 7, the third-party node includes:

a transceiver module 71, configured to receive, in a specified first spectrum, a request message sent by a network side device that belongs to an operator different from an operator of the third-party node, where the request message is used to request the selected third-party node to forward data that is transmitted between the network side device and a terminal served by the network side device;

a processing module 72, configured to return a response message to the network side device in the first spectrum after it is determined to accept the request of the network side device; and a forwarding module 73, configured to forward, in a second spectrum, the data that is transmitted between the network side device and the terminal, where the second spectrum is a spectrum of the operator to which the network side device belongs.

In this embodiment of the present invention, the first spectrum refers to a spectrum that can be identified by network side devices and/or terminals of multiple operators, where the first spectrum may be an unlicensed (unlicensed) spectrum, or may be a part of a spectrum of at least one operator of the multiple operators.

In this embodiment of the present invention, the spectrum of the operator to which the network side device belongs refers to a dedicated spectrum configured by a system for the operator to which the network side device belongs, that is, an exclusive spectrum of the operator to which the network side device belongs. A device of the operator (including a network side device and a terminal) may transmit data in the dedicated spectrum configured by the system for the operator.

The third-party node provided in this embodiment of the present invention receives, in a first spectrum, a request message sent by a network side device, returns a response message to the network side device in the first spectrum after the third-party node determines to accept the request of the network side device, and forwards, in a second spectrum, data that is transmitted between the network side device and a terminal. Therefore, signal amplification and data forwarding services of the network side device are completed, and signal transmission quality is improved.

In an implementation, before receiving the request message sent by the network side device, the transceiver module 71 is further configured to:

after receiving, in the first spectrum, a broadcast message sent by the network side device, send, to the network side device in the first spectrum, a feedback message used to indicate that the third-party node is in an idle state, and for details, refer to the foregoing manner 1, which is not described herein again; or when it is determined that the third-party node is in an idle state, send, in the first spectrum, a pilot signal used to indicate that the third-party node is in an idle state, and for details, refer to the foregoing manner 2 and the foregoing manner 3, which are not described herein again.

In an implementation, after receiving the request message sent by the network side device, the transceiver module 71 is further configured to stop sending the pilot signal in the first spectrum.

Based on any one of the foregoing embodiments, the transceiver module 71 is further configured to: when it is determined that a status of the third-party node changes, notify the network side device that the status of the third-party node changes, where the status of the third-party node includes an idle state and a non-idle state.

Based on any one of the foregoing embodiments, if the transceiver module 71 receives, in the first spectrum, a notification message sent by the network side device, the forwarding module 73 is further configured to stop forwarding the data that is transmitted between the network side device and the terminal.

Further, the forwarding module 73 stops forwarding the data that is transmitted between the network side device and the terminal, and the transceiver module 71 is further configured to:

when it is determined that the third-party node is in an idle state, send, in the first spectrum, the pilot signal used to indicate that the third-party node is in an idle state.

Figure 8:
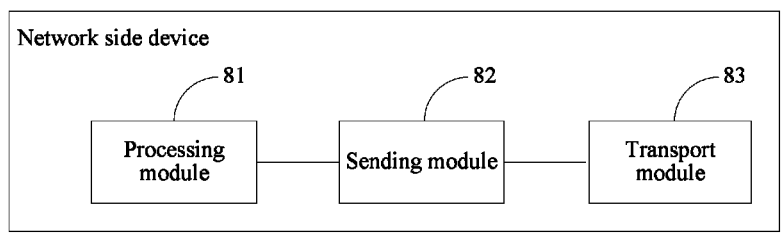
FIG. 8 is a schematic structural diagram of a network side device according to an embodiment of the present invention.

Based on a same inventive concept, an embodiment of the present invention further provides a network side device. Referring to FIG. 8, the network side device includes:

a processing module 81, configured to select at least one third-party node from a first node list that includes a third-party node that belongs to an operator different from an operator of the network side device;

a sending module 82, configured to send, in a first spectrum, a request message to each selected third-party node, where the request message is used to request the selected third-party node to forward data that is transmitted between the network side device and a terminal; and a transmission module 83, configured to: after a response message returned by the selected third-party node is received in the first spectrum, send data to the terminal in a second spectrum by using the selected third-party node, and/or receive, in a second spectrum by using the selected third-party node, data sent by the terminal, where the second spectrum is a spectrum of the operator to which the network side device belongs.

In this embodiment of the present invention, the first spectrum refers to a spectrum that can be identified by network side devices and/or terminals of multiple operators, where the first spectrum may be an unlicensed (unlicensed) spectrum, or may be a part of a spectrum of at least one operator of the multiple operators.

In this embodiment of the present invention, the spectrum of the operator to which the network side device belongs refers to a dedicated spectrum configured by a system for the operator to which the network side device belongs, that is, an exclusive spectrum of the operator to which the network side device belongs. A device of the operator (including a network side device and a terminal) may transmit data in the dedicated spectrum configured by the system for the operator.

The network side device provided in this embodiment of the present invention can fully utilize idle resources of a third-party node to provide a data forwarding service for the network side device and a terminal served by the network side device. Therefore, signal amplification and data forwarding services of the network side device are completed, and signal transmission quality is improved. Because a third-party node can be utilized to provide a data forwarding service, a quantity of network side devices that need to be deployed can be reduced.

In an implementation, determining, by the processing module 81, that a specified triggering condition is met specifically includes:

when it is determined, according to channel quality information reported by the terminal, that quality of a channel between the network side device and the terminal is less than a set value, determining that the specified triggering condition is met, and for details, refer to the foregoing manner 1, which is not described herein again;

or after indication information sent by the terminal is received, determining that the specified triggering condition is met, where the indication information is used to instruct the network side device to forward, by using the third-party node, the data that is transmitted between the network side device and the terminal, and for details, refer to the foregoing manner 2, which is not described herein again.

In an implementation, the processing module 81 creates the first node list in any one of the following manners:

sending a broadcast message in the first spectrum, and after a feedback message sent by a third-party node in an idle state is received, storing the third-party node in the first node list, and for details, refer to the foregoing manner 1, which is not described herein again; or receiving a pilot signal that is sent by a third-party node in an idle state in the first spectrum and that is used to indicate that the third-party node is in an idle state, and storing the third-party node in the first node list, and for details, refer to the foregoing manner 2, which is not described herein again; or receiving a pilot signal that is sent by a third-party node in an idle state in the first spectrum and that is used to indicate that the third-party node is in an idle state, storing the third-party node in the first node list, receiving a second node list that is sent by the terminal served by the network side device, that is stored in the terminal, and that includes at least one third-party node that can be used by the terminal, and storing the second node list, and for details, refer to the foregoing manner 3, which is not described herein again.

In this embodiment of the present invention, the first node list stored by the processing module 81 includes identifier information of each third-party node that is determined by the network side device, that can provide a data forwarding service for the network side device and the terminal served by the network side device, and that belongs to an operator different from the operator of the network side device.

Preferably, the first node list further includes information used to indicate quality of a signal between the foregoing third-party node and the network side device.

Preferably, the second node list further includes information used to indicate quality of a signal between the foregoing third-party node and the terminal.

Based on the foregoing three manners of creating the first node list, in an implementation, the processing module 81 is further configured to:

update, in a set update period, the first node list stored in the network side device; or when it is determined that the data that is transmitted between the network side device and the terminal served by the network side device needs to be forwarded by using a third-party node, update the first node list stored in the network side device; or after a message that is sent by any third-party node and that is used to notify each network side device that a status of the third-party node changes is received, update the first node list stored in the network side device; or update, according to signal quality, of each third-party node in the second node list, that is obtained by means of detection by the terminal and that is notified by the terminal, the second node list stored in the network side device.

Based on any one of the foregoing embodiments, the selecting, by a processing module 81, at least one third-party node from a first node list specifically includes:

randomly selecting at least one third-party node from the first node list, and for details, refer to the foregoing method 1, which is not described herein again; or acquiring information about a location of the terminal, and selecting, from the first node list, at least one third-party node that is the closest to the location of the terminal, and for details, refer to the foregoing method 2, which is not described herein again; or selecting at least one third-party node from third-party nodes included in both the first node list and the second node list, and for details, refer to the foregoing method 3, which is not described herein again.

Based on any one of the foregoing embodiments, the processing module 81 is further configured to:

determine, according to channel quality information fed back by the terminal, whether to continue forwarding, by using the selected third-party node, the data that is transmitted between the network side device and the terminal.

Further, if the processing module 81 determines to finish forwarding, by using the selected third-party node, the data that is transmitted between the network side device and the terminal, the sending module 82 is further configured to:

send a notification message to the selected third-party node in the first spectrum, to instruct the selected third-party node to stop forwarding the data that is transmitted between the network side device and the terminal.

Further, after the sending module 82 sends the notification message to the selected third-party node, the processing module 81 is further configured to:

reselect a third-party node from the first node list, send data to the terminal by using the reselected third-party node, and receive, by using the reselected third-party node, data sent by the terminal.

Figure 9:
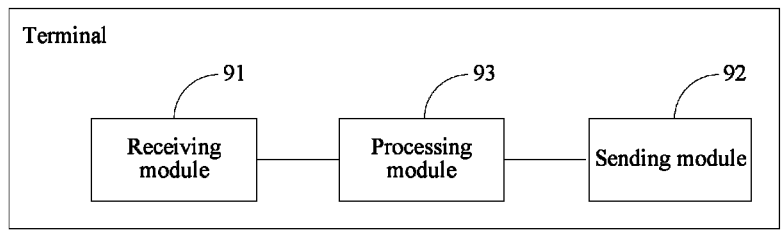
FIG. 9 is a schematic structural diagram of a terminal according to an embodiment of the present invention.

Based on a same inventive concept, an embodiment of the present invention provides a terminal. Referring to FIG. 9, the terminal is in communication connection with a network side device, and the terminal includes:

a receiving module 91, configured to receive, in a second spectrum, data that is sent by the network side device and that is forwarded by a third-party node that is selected by the network side device and that belongs to an operator different from an operator of the network side device, where the second spectrum is a spectrum of the operator to which the network side device belongs; and a sending module 92, configured to send data to the network side device in the second spectrum, where the data is forwarded to the network side device by using the third-party node.

In this embodiment of the present invention, the spectrum of the operator to which the network side device belongs refers to a dedicated spectrum configured by a system for the operator to which the network side device belongs, that is, an exclusive spectrum of the operator to which the network side device belongs. A device of the operator (including a network side device and a terminal) may transmit data in the dedicated spectrum configured by the system for the operator.

In this embodiment of the present invention, the terminal in communication connection with the network side device can receive, in a second spectrum, data that is forwarded by a third-party node selected by the network side device and that is sent to the terminal from the network side device, and the terminal can send data to the network side device by using the third-party node, so that idle resources of the third-party node are fully utilized to provide a data forwarding service for the network side device and the terminal served by the network side device. Therefore, signal amplification and data forwarding services of the network side device are completed, and signal transmission quality is improved. Because a third-party node can be utilized to provide a data forwarding service, a quantity of network side devices that need to be deployed can be reduced.

In an implementation, the sending module 92 is further configured to:

send indication information to the network side device, to instruct the network side device to forward, by using the third-party node, the data that is transmitted between the network side device and the terminal.

Based on any one of the foregoing embodiments, the receiving module 91 is further configured to: receive a pilot signal that is sent by a third-party node in an idle state in a specified first spectrum and that is used to indicate that the third-party node is in an idle state, and store the third-party node in a second node list; and the sending module 92 is further configured to send the second node list to the network side device.

In this embodiment of the present invention, the first spectrum refers to a spectrum that can be identified by network side devices and/or terminals of multiple operators, where the first spectrum may be an unlicensed (unlicensed) spectrum, or may be a part of a spectrum of at least one operator of the multiple operators.

Further, in a preferred implementation manner (for details, refer to the foregoing manner A), the terminal further includes a processing module 93, where the processing module 93 is configured to detect, in a set detection period, signal quality of each third-party node in the second node list, and the sending module 92 is further configured to notify the signal quality acquired by the processing module 93 to the network side device.

In another preferred implementation manner (for details, refer to the foregoing manner B), the terminal further includes a processing module 93, where the processing module 93 is configured to: detect, in a set detection period, signal quality of each third-party node in the second node list, and update, according to the acquired signal quality, the second node list stored in the terminal; or update, in a set update period, the second node list stored in the terminal.

The following describes a structure and a processing manner of a third-party node according to an embodiment of the present invention with reference to a preferred hardware structure.

Figure 10:
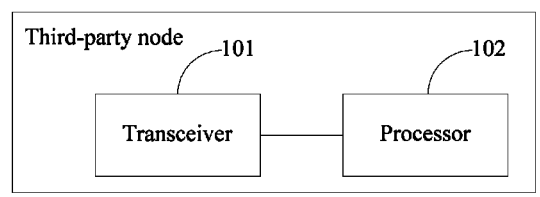
FIG. 10 is a schematic structural diagram of another third-party node according an embodiment of the present invention.

Referring to FIG. 10, the third-party node includes a transceiver 101 and at least one processor 102 connected to the transceiver 101, where:

the transceiver 101 is configured to receive, in a specified first spectrum, a request message sent by a network side device that belongs to an operator different from an operator of the third-party node, where the request message is used to request the selected third-party node to forward data that is transmitted between the network side device and a terminal served by the network side device; and the processor 102 is configured to: after it is determined to accept the request of the network side device, trigger the transceiver 101 to return a response message to the network side device in the first spectrum; and trigger the transceiver 101 to forward, in a second spectrum, the data that is transmitted between the network side device and the terminal, where the second spectrum is a spectrum of the operator to which the network side device belongs.

In this embodiment of the present invention, the first spectrum refers to a spectrum that can be identified by network side devices and/or terminals of multiple operators, where the first spectrum may be an unlicensed (unlicensed) spectrum, or may be a part of a spectrum of at least one operator of the multiple operators.

In this embodiment of the present invention, the spectrum of the operator to which the network side device belongs refers to a dedicated spectrum configured by a system for the operator to which the network side device belongs, that is, an exclusive spectrum of the operator to which the network side device belongs. A device of the operator (including a network side device and a terminal) may transmit data in the dedicated spectrum configured by the system for the operator.

In an implementation, before receiving the request message sent by the network side device, the transceiver 101 is further configured to:

after receiving, in the first spectrum, a broadcast message sent by the network side device, send, to the network side device in the first spectrum, a feedback message used to indicate that the third-party node is in an idle state, and for details, refer to the foregoing manner 1, which is not described herein again; or when it is determined that the third-party node is in an idle state, send, in the first spectrum, a pilot signal used to indicate that the third-party node is in an idle state, and for details, refer to the foregoing manner 2 and the foregoing manner 3, which are not described herein again.

In an implementation, after receiving the request message sent by the network side device, the transceiver 101 is further configured to stop sending the pilot signal in the first spectrum.

Based on any one of the foregoing embodiments, the processor 102 is further configured to: when it is determined that a status of the third-party node changes, trigger the transceiver 101 to notify the network side device that the status of the third-party node changes, where the status of the third-party node includes an idle state and a non-idle state.

Based on any one of the foregoing embodiments, if the transceiver 101 receives, in the first spectrum, a notification message sent by the network side device, the transceiver 101 stops forwarding the data that is transmitted between the network side device and the terminal.

Further, after the transceiver 101 stops forwarding the data that is transmitted between the network side device and the terminal, the processor 102 is further configured to:

when it is determined that the third-party node is in an idle state, trigger the transceiver 101 to send, in the first spectrum, the pilot signal used to indicate that the third-party node is in an idle state.

The following describes a structure and a processing manner of a network side device according to an embodiment of the present invention with reference to a preferred hardware structure.

Figure 11:
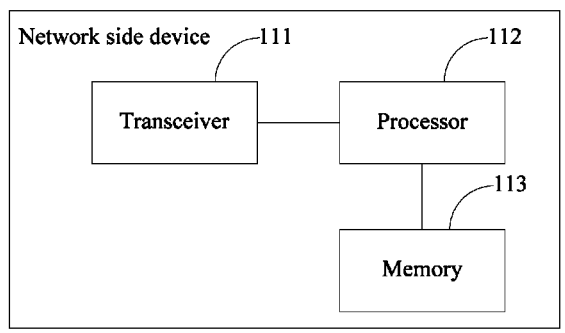
FIG. 11 is a schematic structural diagram of another network side device according to an embodiment of the present invention.

Referring to FIG. 11, the network side device includes a transceiver 111, at least one processor 112 connected to the transceiver 111, and a memory 113 separately connected to the transceiver 111 and the processor 112, where:

the processor 112 is configured to select at least one third-party node from a first node list that includes a third-party node that belongs to an operator different from an operator of the network side device; and the transceiver 111 is configured to send, in a specified first spectrum, a request message to each selected third-party node, where the request message is used to request the selected third-party node to forward data that is transmitted between the network side device and the terminal; and after receiving, in the first spectrum, a response message returned by the selected third-party node, send data to the terminal in a second spectrum by using the selected third-party node, and/or receive, in a second spectrum by using the selected third-party node, data sent by the terminal, where the second spectrum is a spectrum of the operator to which the network side device belongs.

In this embodiment of the present invention, the first spectrum refers to a spectrum that can be identified by network side devices and/or terminals of multiple operators, where the first spectrum may be an unlicensed (unlicensed) spectrum, or may be a part of a spectrum of at least one operator of the multiple operators.

In this embodiment of the present invention, the spectrum of the operator to which the network side device belongs refers to a dedicated spectrum configured by a system for the operator to which the network side device belongs, that is, an exclusive spectrum of the operator to which the network side device belongs. A device of the operator (including a network side device and a terminal) may transmit data in the dedicated spectrum configured by the system for the operator.

In an implementation, determining, by the processor 112, that a specified triggering condition is met specifically includes:

when it is determined, according to channel quality information reported by the terminal, that quality of a channel between the network side device and the terminal is less than a set value, determining that the specified triggering condition is met, and for details, refer to the foregoing manner 1, which is not described herein again;

or after indication information sent by the terminal is received, determining that the specified triggering condition is met, where the indication information is used to instruct the network side device to forward, by using the third-party node, the data that is transmitted between the network side device and the terminal, and for details, refer to the foregoing manner 2, which is not described herein again.

In an implementation, the network side device creates the first node list in any one of the following manners:

sending, by the transceiver 111, a broadcast message in the first spectrum, and after a feedback message sent by a third-party node in an idle state is received, storing, by the processor 112, the third-party node in the first node list in the memory 113, and for details, refer to the foregoing manner 1, which is not described herein again;

or receiving, by the transceiver 111, a pilot signal that is sent by a third-party node in an idle state in the first spectrum and that is used to indicate that the third-party node is in an idle state, and storing, by the processor 112, the third-party node in the first node list in the memory 113, and for details, refer to the foregoing manner 2, which is not described herein again;

or receiving, by the transceiver 111, a pilot signal that is sent by a third-party node in an idle state in the first spectrum and that is used to indicate that the third-party node is in an idle state, storing, by the processor 112, the third-party node in the first node list, receiving, by the transceiver 111, a second node list that is sent by a terminal served by the network side device, that is stored in the terminal, and that includes at least one third-party node that can be used by the terminal, and storing, by the processor 112, the second node list in the memory 113, and for details, refer to the foregoing manner 3, which is not described herein again.

In this embodiment of the present invention, the first node list stored in the memory 113 includes identifier information of each third-party node that is determined by the network side device, that can provide a data forwarding service for the network side device and the terminal served by the network side device, and that belongs to an operator different from the operator of the network side device.

Preferably, the first node list further includes information used to indicate quality of a signal between the foregoing third-party node and the network side device.

Preferably, the second node list further includes information used to indicate quality of a signal between the foregoing third-party node and the terminal.

Based on the foregoing three manners of creating the first node list, in an implementation, the processor 112 is further configured to:

update, in a set update period, the first node list stored in the memory 113; or when it is determined that data that is transmitted between the network side device and the terminal served by the network side device needs to be forwarded by using a third-party node, update the first node list stored in the memory 113; or after the transceiver 111 receives a message that is sent by any third-party node and that is used to notify each network side device that a status of the third-party node changes, update the first node list stored in the memory 113; or update, according to signal quality, of each third-party node in the second node list, that is obtained by means of detection by the terminal and that is notified by the terminal, the second node list stored in the memory 113.

Based on any one of the foregoing embodiments, the selecting, by a processor 112, at least one third-party node from a first node list specifically includes:

randomly selecting at least one third-party node from the first node list stored in the memory 113, and for details, refer to the foregoing method 1, which is not described herein again; or acquiring information about a location of the terminal, and selecting, from the first node list stored in the memory 113, at least one third-party node that is the closest to the location of the terminal, and for details, refer to the foregoing method 2, which is not described herein again; or selecting at least one third-party node from third-party nodes included in both the first node list and the second node list that are stored in the memory 113, and for details, refer to the foregoing method 3, which is not described herein again.

Based on any one of the foregoing embodiments, the processor 112 is further configured to:

determine, according to channel quality information fed back by the terminal, whether to continue forwarding, by using the selected third-party node, the data that is transmitted between the network side device and the terminal.

Further, if the processor 112 determines to finish forwarding, by using the selected third-party node, the data that is transmitted between the network side device and the terminal, the transceiver 111 is further configured to:

send a notification message to the selected third-party node in the first spectrum, to instruct the selected third-party node to stop forwarding the data that is transmitted between the network side device and the terminal.

Further, after the transceiver 111 sends the notification message to the selected third-party node, the processor 112 is further configured to:

reselect a third-party node from the first node list stored in the memory 113, and instruct the transceiver 111 to send data to the terminal by using the reselected third-party node and to receive, by using the reselected third-party node, data sent by the terminal.

The following describes a structure and a processing manner of a terminal according to an embodiment of the present invention with reference to a preferred hardware structure.

Figure 12:
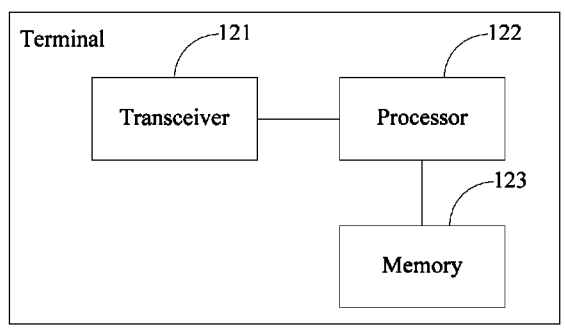
FIG. 12 is a schematic structural diagram of another terminal according to an embodiment of the present invention.

Referring to FIG. 12, the terminal is in communication connection with a network side device, and the terminal includes a transceiver 121, at least one processor 122 connected to the transceiver 121, and a memory 123 separately connected to the transceiver 121 and the processor 122, where:

the transceiver 121 is configured to receive, in a second spectrum, data that is sent by the network side device and that is forwarded by a third-party node that is selected by the network side device and that belongs to an operator different from an operator of the network side device, where the second spectrum is a spectrum of the operator to which the network side device belongs; and send data to the network side device in the second spectrum, where the data is forwarded to the network side device by using the third-party node.

In this embodiment of the present invention, the spectrum of the operator to which the network side device belongs refers to a dedicated spectrum configured by a system for the operator to which the network side device belongs, that is, an exclusive spectrum of the operator to which the network side device belongs. A device of the operator (including a network side device and a terminal) may transmit data in the dedicated spectrum configured by the system for the operator.

In an implementation, the transceiver 121 is further configured to:

send indication information to the network side device, to instruct the network side device to forward, by using the third-party node, the data that is transmitted between the network side device and the terminal.

Based on any one of the foregoing embodiments, the transceiver 121 is further configured to receive a pilot signal that is sent by a third-party node in an idle state in a specified first spectrum and that is used to indicate that the third-party node is in an idle state; the processor 122 is further configured to store the third-party node in the second node list stored in the memory 123; and the transceiver 121 is further configured to send the second node list to the network side device.

In this embodiment of the present invention, the first spectrum refers to a spectrum that can be identified by network side devices and/or terminals of multiple operators, where the first spectrum may be an unlicensed (unlicensed) spectrum, or may be a part of a spectrum of at least one operator of the multiple operators.

Further, in a preferred implementation manner (for details, refer to the foregoing manner A), the processor 122 is further configured to detect, in a set detection period, signal quality of each third-party node in the second node list, and the transceiver 121 is further configured to notify the signal quality acquired by the processor 122 to the network side device.

In another preferred implementation manner (for details, refer to the foregoing manner B), the processor 122 is further configured to: detect, in a set detection period, signal quality of each third-party node in the second node list, and update, according to the acquired signal quality, the second node list stored in the memory 123; or update, in a set update period, the second node list stored in the memory 123.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A third-party node, wherein the third-party node comprises:
   a transceiver, configured to receive, in a specified first spectrum, a request message sent by a network side device that belongs to an operator different from an operator of the third-party node, wherein the request message is used to request the selected third-party node to forward data that is transmitted between the network side device and a terminal served by the network side device;
   a processor, configured to, after it is determined to accept the request of the network side device, return a response message to the network side device in the first spectrum; wherein
   the transceiver is further configured to forward, in a second spectrum, the data that is transmitted between the network side device and the terminal, wherein the second spectrum is a spectrum of the operator to which the network side device belongs.

2. The third-party node according to claim 1, wherein before receiving the request message sent by the network side device, the transceiver is further configured to:
   after receiving, in the first spectrum, a broadcast message sent by the network side device, send, to the network side device in the first spectrum, a feedback message used to indicate that the third-party node is in an idle state; or when it is determined that the third-party node is in an idle state, send, in the first spectrum, a pilot signal used to indicate that the third-party node is in an idle state.

3. The third-party node according to claim 2, wherein after the transceiver receives the request message sent by the network side device, the transceiver module is further configured to stop sending the pilot signal in the first spectrum.

4. The third-party node according to claim 2, wherein if the transceiver receives, in the first spectrum, a notification message sent by the network side device, the forwarding module is further configured to:
   stop forwarding the data that is transmitted between the network side device and the terminal.

5. The third-party node according to claim 4, wherein the transceiver stops forwarding the data that is transmitted between the network side device and the terminal, and the transceiver is further configured to:
   when it is determined that the third-party node is in an idle state, send, in the first spectrum, the pilot signal used to indicate that the third-party node is in an idle state.

6. The third-party node according to claim 1, wherein the transceiver is further configured to:
   when it is determined that a status of the third-party node changes, notify the network side device that the status of the third-party node changes, wherein the status of the third-party node comprises one of an idle state and a non-idle state.

7. A network side device, wherein the network side device comprises:
   a processor, configured to select at least one third-party node from a first node list that comprises a third-party node that belongs to an operator different from an operator of the network side device;

a transceiver, configured to send, in a first spectrum, a request message to the at least one selected third-party node, wherein the request message is used to request the at least one selected third-party node to forward data that is transmitted between the network side device and the terminal; and after a response message returned by the at least one selected third-party node is received in the first spectrum, send data to the terminal in a second spectrum using the at least one selected third-party node, and/or receive, in a second spectrum using the at least one selected third-party node, data sent by the terminal, wherein the second spectrum is a spectrum of the operator to which the network side device belongs.

8. The network side device according to claim 7, wherein the processor creates the first node list in any one of the following manners:
sending, by the transceiver, a broadcast message in the first spectrum, and after a feedback message sent by a third-party node in an idle state is received, storing, by the processor, the third-party node in the first node list; or
receiving, by the transceiver, a pilot signal that is sent by a third-party node in an idle state in the first spectrum and that is used to indicate that the third-party node is in an idle state, and storing, by the processor, the third-party node in the first node list; or
receiving, by the transceiver, a pilot signal that is sent by a third-party node in an idle state in the first spectrum and that is used to indicate that the third-party node is in an idle state, storing, by the processor, the third-party node in the first node list, receiving, by the transceiver, a second node list that is sent by the terminal served by the network side device, that is stored in the terminal, and that comprises at least one third-party node that can be used by the terminal, and storing, by the processor, the second node list.

9. The network side device according to claim 7, wherein the processor is further configured to:
update, in a set update period, the first node list stored in the network side device; or when it is determined that data that is transmitted between the network side device and the terminal served by the network side device needs to be forwarded using a third-party node, update the first node list stored in the network side device; or after a message that is sent by any third-party node and that is used to notify each network side device that a status of the third-party node changes is received, update the first node list stored in the network side device; or update, according to a signal quality of each third-party node in the second node list that is obtained by means of detection by the terminal and that is notified by the terminal, the second node list stored in the network side device.

10. The network side device according to claim 7, wherein the selecting, by the processor, at least one third-party node from the first node list comprises:
randomly selecting at least one third-party node from the first node list; or acquiring information about a location of the terminal, and selecting, from the first node list, at least one third-party node that is the closest to the location of the terminal; or selecting at least one third-party node from third-party nodes comprised in both the first node list and the second node list.

11. The network side device according to claim 7, wherein the processor is further configured to:

determine, according to channel quality information fed back by the terminal, whether to continue forwarding, using the at least one selected third-party node, the data that is transmitted between the network side device and the terminal.

12. The network side device according to claim 11, wherein if the processor determines to finish forwarding, using the at least one selected third-party node, the data that is transmitted between the network side device and the terminal, the transceiver is further configured to:
send a notification message to the at least one selected third-party node in the first spectrum, to instruct the at least one selected third-party node to stop forwarding the data that is transmitted between the network side device and the terminal.

13. The network side device according to claim 12, wherein after the transceiver sends the notification message to the at least one selected third-party node, the processor is further configured to:
reselect a third-party node from the first node list, send data to the terminal using the reselected third-party node, and receive, using the reselected third-party node, data sent by the terminal.

14. A terminal, wherein the terminal is in communication connection with a network side device, and the terminal comprises:
a transceiver, configured to receive, in a second spectrum, data that is sent by the network side device and that is forwarded by a third-party node that is selected by the network side device and that belongs to an operator different from an operator of the network side device, wherein the second spectrum is a spectrum of the operator to which the network side device belongs; and
a sending module, configured to send data to the network side device in the second spectrum, wherein the data is forwarded to the network side device using the third-party node.

15. The terminal according to claim 14, wherein the transceiver is further configured to:
send indication information to the network side device, to instruct the network side device to forward, using the third-party node, the data that is transmitted between the network side device and the terminal.

16. The terminal according to claim 14, wherein
the transceiver is further configured to: receive a pilot signal that is sent by a third-party node in an idle state in a specified first spectrum and that is used to indicate that the third-party node in the idle state is in an idle state, and store the third-party node in the idle state in a second node list; and
the transceiver is further configured to send the second node list to the network side device.

17. The terminal according to claim 16 wherein the terminal further comprises a processor, wherein
the processor is configured to detect, in a set detection period, a signal quality of each third-party node in the second node list, and
the transceiver is further configured to notify the signal quality of each third-party node detected by the processing module to the network side device.

18. The terminal according to claim 16, wherein the terminal further comprises:
a processor, configured to: detect, in a set detection period, a signal quality of each third-party node in the second node list, and update, according to the detected signal quality, the second node list stored in the terminal; or update, in a set update period, the second node list stored in the terminal.

\* \* \* \* \*